(12) United States Patent
Proksch et al.

(10) Patent No.: US 8,024,963 B2
(45) Date of Patent: Sep. 27, 2011

(54) MATERIAL PROPERTY MEASUREMENTS USING MULTIPLE FREQUENCY ATOMIC FORCE MICROSCOPY

(75) Inventors: Roger Proksch, Santa Barbara, CA (US); Roger C. Callahan, Goleta, CA (US)

(73) Assignee: Asylum Research Corporation, Goleta, CA (US)

( * ) Notice: Subject to any disclaimer, the term of this patent is extended or adjusted under 35 U.S.C. 154(b) by 564 days.

(21) Appl. No.: 12/214,031

(22) Filed: Jun. 16, 2008

(65) Prior Publication Data

US 2009/0013770 A1 Jan. 15, 2009

Related U.S. Application Data

(63) Continuation-in-part of application No. 11/544,130, filed on Oct. 5, 2006, now Pat. No. 7,603,891.

(60) Provisional application No. 60/936,147, filed on Jun. 18, 2007.

(51) Int. Cl.
*G01B 5/28* (2006.01)
*G01Q 10/00* (2010.01)
(52) U.S. Cl. ............. 73/105; 850/1; 850/5; 850/33
(58) Field of Classification Search ............. 73/105; 850/1, 5, 33
See application file for complete search history.

(56) References Cited

U.S. PATENT DOCUMENTS

| | | | |
|---|---|---|---|
| RE33,937 E | 5/1992 | Schubert | |
| 5,267,471 A * | 12/1993 | Abraham et al. | 73/105 |
| 5,444,244 A | 8/1995 | Kirk et al. | |
| 5,483,822 A | 1/1996 | Albrecht et al. | |
| 5,503,010 A | 4/1996 | Yamanaka | |
| 5,519,212 A | 5/1996 | Elings et al. | |
| 5,646,339 A | 7/1997 | Bayer et al. | |
| 5,742,377 A | 4/1998 | Minne et al. | |
| 5,763,768 A | 6/1998 | Henderson et al. | |
| 5,804,708 A | 9/1998 | Yamanaka et al. | |
| 5,866,805 A | 2/1999 | Han et al. | |
| 5,877,412 A | 3/1999 | Muramatsu et al. | |
| 5,883,705 A | 3/1999 | Minne et al. | |
| 5,924,845 A | 7/1999 | Bagley et al. | |
| 5,994,820 A | 11/1999 | Kleindiek | |
| 6,006,593 A | 12/1999 | Yamanaka | |
| RE36,488 E | 1/2000 | Elings et al. | |
| 6,051,833 A | 4/2000 | Yatsutake | |
| 6,075,585 A | 6/2000 | Minne et al. | |
| 6,079,255 A | 6/2000 | Binnig et al. | |
| 6,249,000 B1 | 6/2001 | Muramatsu et al. | |
| 6,298,715 B1 | 10/2001 | Thomson et al. | |
| 6,349,591 B1 | 2/2002 | Fretigny et al. | |
| 6,452,170 B1 | 9/2002 | Zypman et al. | |
| 6,465,782 B1 | 10/2002 | Kendall | |
| 6,578,410 B1 | 6/2003 | Israelachvili | |
| 6,767,696 B2 | 7/2004 | Howald et al. | |
| 6,880,386 B1 | 4/2005 | Krotil et al. | |
| 6,935,167 B1 | 8/2005 | Sahin et al. | |
| 7,089,787 B2 | 8/2006 | Sahin et al. | |
| 7,107,825 B2 * | 9/2006 | Degertekin et al. | 73/105 |

* cited by examiner

*Primary Examiner* — Daniel S Larkin
(74) *Attorney, Agent, or Firm* — Law Office of Scott C. Harris, Inc.

(57) ABSTRACT

Apparatus and techniques for extracting information carried in higher eigenmodes or harmonics of an oscillating cantilever or other oscillating sensors in atomic force microscopy and related MEMs work are described. Similar apparatus and techniques for extracting information using contact resonance with multiple excitation signals are also described.

3 Claims, 16 Drawing Sheets

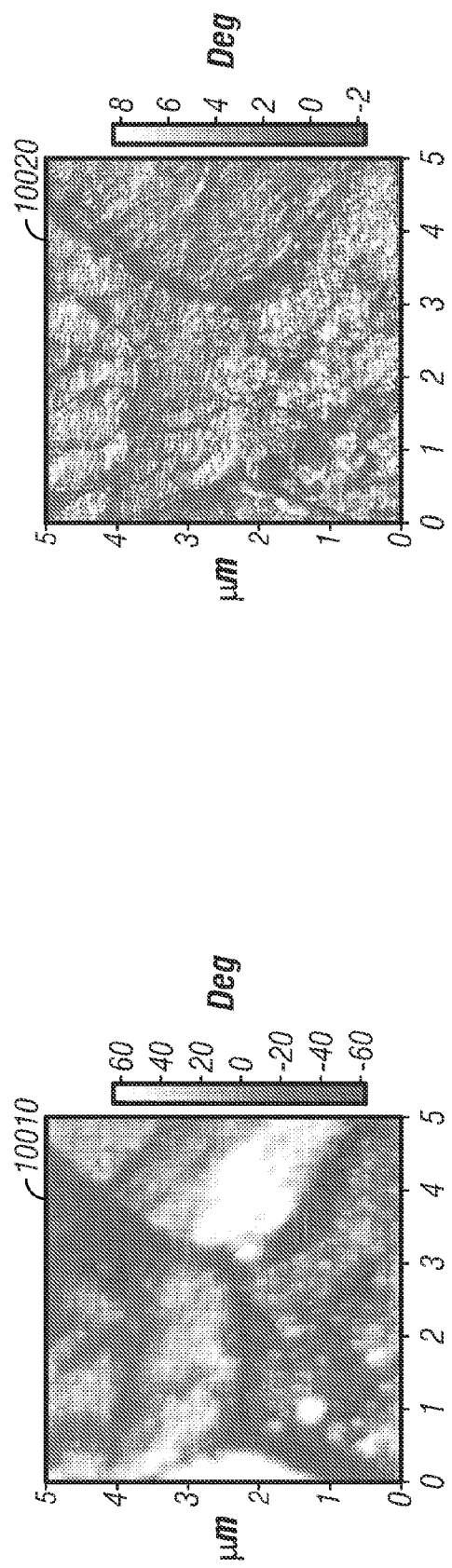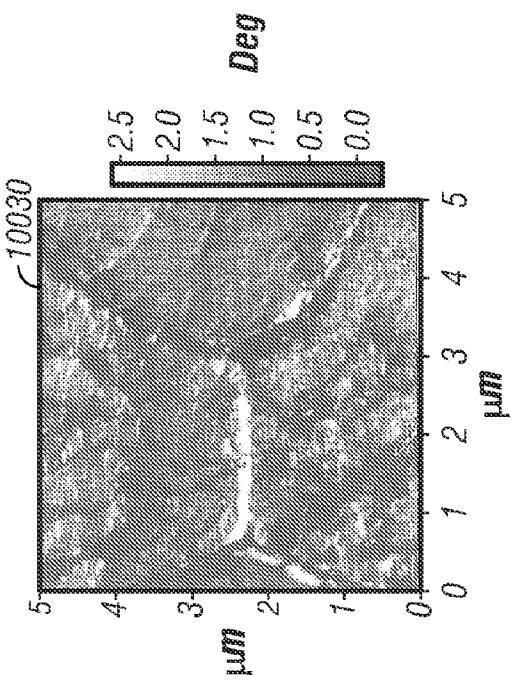
FIG. 10A
FIG. 10B
FIG. 10C

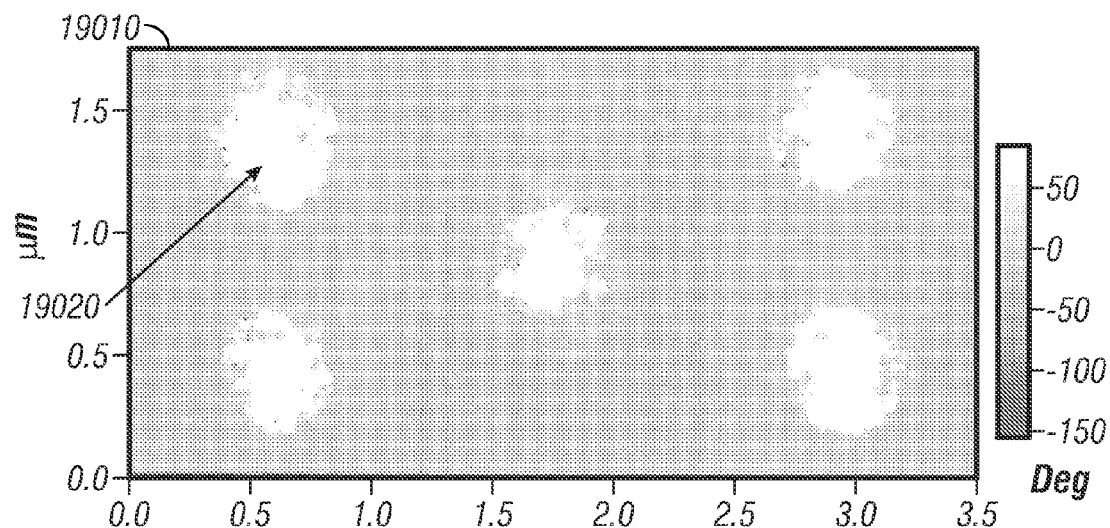
FIG. 17
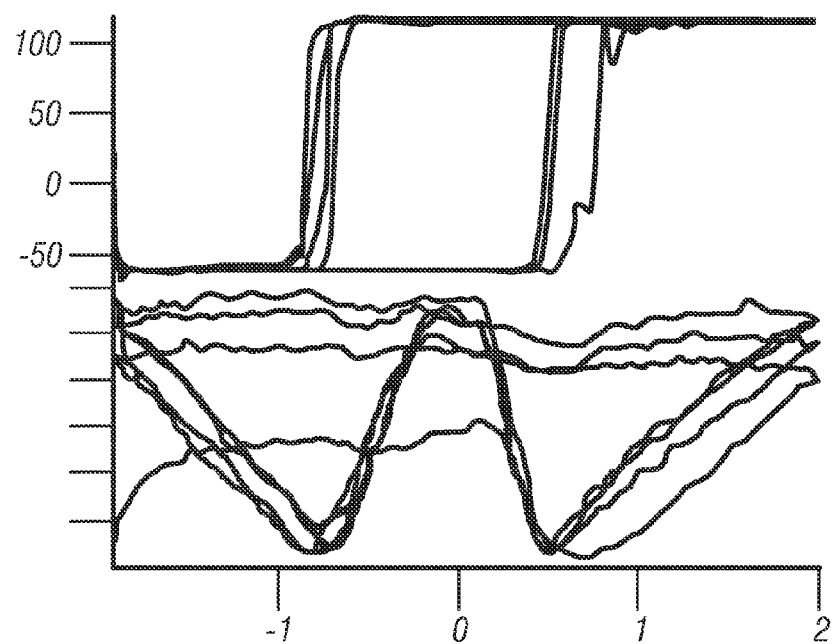
FIG. 18    V

MATERIAL PROPERTY MEASUREMENTS USING MULTIPLE FREQUENCY ATOMIC FORCE MICROSCOPY

REFERENCES CITED

U.S. Patent Documents

RE36488 January 2000 Minne et al.
RE36488 January 2000 Elings et al.
Re. 33937 May, 1995 Schubert
U.S. Pat. No. 5,444,244 August 1995 Kirk et al.
U.S. Pat. No. 5,477,732 December 1995 Yasue et al.
U.S. Pat. No. 5,483,822 January 2001 Albrecht et al.
U.S. Pat. No. 5,503,010 April 1996 Yamanaka
U.S. Pat. No. 5,519,212 May 1995 Elings et al.
U.S. Pat. No. 5,519,212 May 1996 Bayer et al.
U.S. Pat. No. 5,646,339 July 1997 Bayer et al.
U.S. Pat. No. 5,646,339 July 1997 Minne et al.
U.S. Pat. No. 5,742,377 April 1998 Han et al.
U.S. Pat. No. 5,742,377 April 1998 Minne et al.
U.S. Pat. No. 5,763,768 June 1996 Henderson et al.
U.S. Pat. No. 5,804,708 September 1998 Yamanaka et al.
U.S. Pat. No. 5,866,805 February 1999 Muramatsu et al.
U.S. Pat. No. 5,866,805 February 1999 Han et al.
U.S. Pat. No. 5,877,412 March 1999 Minne et al.
U.S. Pat. No. 5,883,705 March 1999 Elings et al.
U.S. Pat. No. 5,924,845 July 1999 Bagley et al.
U.S. Pat. No. 5,994,820 November 1999 Kleindiek
U.S. Pat. No. 6,006,593 December 1999 Yamanaka
U.S. Pat. No. 6,051,833 April 2000 Yasutake
U.S. Pat. No. 6,075,585 June 2000 Binning et al.
U.S. Pat. No. 6,075,585 June 2000 Minne et al.
U.S. Pat. No. 6,079,255 June 2000 Thomson et al.
U.S. Pat. No. 6,249,000 June 2001 Muramatsu et al.
U.S. Pat. No. 6,298,715 October 2001 Fretigny et al.
U.S. Pat. No. 6,298,715 October 2001 Thomson et al.
U.S. Pat. No. 6,349,591 February 2002 Zypman et al.
U.S. Pat. No. 6,349,591 February 2002 Fretigny et al.
U.S. Pat. No. 6,452,170 September 2002 Kendall
U.S. Pat. No. 6,452,170 September 2002 Zypman et al.
U.S. Pat. No. 6,465,782 October 2002 Israelachvili
U.S. Pat. No. 6,578,410 June 2003 Howald et al.
U.S. Pat. No. 6,767,696 July 2004 Sahin et al.
U.S. Pat. No. 6,880,386 April 2005 Krotil et al.
U.S. Pat. No. 6,935,167 August 2005
U.S. Pat. No. 7,089,787 August 2006 Sahin et al.

OTHER PUBLICATIONS

T. Drobek, R. W. Stark, and W. M. Heckl, Physical Review B [Condensed Matter and Materials Physics] 64, 045401/1-5 (2001).
F. Krause, F. Kaisinger, H. Starke, G. Persch, and U. Hartmann, Thin Solid Films 264, 141-7 (1995).
R. W. Stark, T. Drobek, and W. M. Heckl, Applied Physics Letters 74, 3296-8 (1999).
T. Drobek, R. W. Stark, and W. M. Heckl, Physical Review B 6404 (2001).
R. W. Stark, G. Schitter, M. Stark, R. Guckenberger, and A. Stemmer, Physical Review B 69 (2004).
R. W. Stark and W. M. Hecki, Surface Science 457, 219-228 (2000).
R. W. Stark, Nanotechnology 15, 347-351 (2004).
R. W. Stark, G. Schitter, and A. Stemmer, Physical Review B 68 (2003).
M. Stark, R. W. Stark, W. M. Heckl, and R. Guckenberger, Proceedings of the National Academy of Sciences of the United States of America 99, 8473-8478 (2002).
J. D. Batteas, A. N. Round, B. Yan, S. Dang, R. Estephan, and R. E. Stark, Abstracts of Papers of the American Chemical Society 221, U343-U343 (2001).
M. Stark, R. W. Stark, W. M. Heckl, and R. Guckenberger, Applied Physics Letters 77, 3293-3295 (2000).
M. Stark and R. Guckenberger, Review of Scientific Instruments 70, 3614-3619 (1999).
R. Szoszkiewicz, A. J. Kulik, and G. Gremaud, Journal of Chemical Physics 122 (2005).
O. Matsuda, T. Terada, K. Inagaki, and O. B. Wright, Japanese Journal of Applied Physics Part 1-Regular Papers Short Notes & Review Papers 41, 3545-3546 (2002).
K. Inagaki, O. Matsuda, and O. B. Wright, Applied Physics Letters 80, 2386-2388 (2002).
A. P. McGuigan, B. D. Huey, G. A. D. Briggs, O. V. Kolosov, Y. Tsukahara, and
M. Yanaka, Applied Physics Letters 80, 1180-1182 (2002).
M. T. Cuberes, G. A. D. Briggs, and O. Kolosov, Nanotechnology 12, 53-59 (2001).
M. T. Cuberes, H. E. Assender, G. A. D. Briggs, and O. V. Kolosov, Journal of Physics D-Applied Physics 33, 2347-2355 (2000).
U. Rabe, V. Scherer, S. Hirsekorn, and W. Arnold, Journal of Vacuum Science & Technology B 15, 1506-1511 (1997).
K. Yamanaka, H. Ogiso, and O. Kolosov, Applied Physics Letters 64, 178-180 (1994).
J. Tamayo, L. Gonzalez, Y. GonzaLez, and R. Garcia, Applied Physics Letters 68, 2297-9 (1996).
R. Garcia, J. Tamayo, M. Calleja, and F. Garcia, Applied Physics A [Materials Science Processing] 66, S309-12 (1998).
P. J. James, M. Antognozzi, J. Tamayo, T. J. McMaster, J. M. Newton, and M. J. Miles, Langmuir 17, 349-60 (2001).
O, Sahin and A. Atalar, Applied Physics Letters 79, 4455-7 (2001).
O, Sahin and A. Atalar, Applied Physics Letters 78, 2973-5 (2001).
O, Sahin, G. Yaralioglu, R. Grow, S. F. Zappe, A. Atalar, C. Quate, and O, Solgaard, Sensors and Actuators a-Physical 114, 183-190 (2004).
O, Sahin, C. F. Quate, O, Solgaard and A. Atalar, Physical Review B 69, 165416 (2004).
U. Rabe, S. Hirsekorn, M. Reinstadtler, T. Sulzbach, Ch. Lehrer and W. Arnold, Nanotechnology 18, 1 (2007).
R. Szoszkiewicz, A. J. Kulik, and G. Gremaud, Journal of Chemical Physics 122 (2005).
L. Muthuswami, P. M. Ajayan, and R. E. Geer, in Microscopy of Semiconducting Materials 2003 (2003), p. 633-636.
L. Muthuswami and R. E. Geer, Applied Physics Letters 84, 5082-5084 (2004).
O. Matsuda, T. Terada, K. Inagaki, and O. B. Wright, Japanese Journal of Applied Physics Part 1-Regular Papers Short Notes & Review Papers 41, 3545-3546 (2002).
K. Inagaki, O. Matsuda, and O. B. Wright, Applied Physics Letters 80, 2386-2388 (2002).
A. P. McGuigan, B. D. Huey, G. A. D. Briggs, O. V. Kolosov, Y. Tsukahara, and M. Yanaka, Applied Physics Letters 80, 1180-1182 (2002).
M. T. Cuberes, G. A. D. Briggs, and O. Kolosov, Nanotechnology 12, 53-59 (2001).
M. T. Cuberes, H. E. Assender, G. A. D. Briggs, and O. V. Kolosov, Journal of Physics D-Applied Physics 33, 2347-2355 (2000).

U. Rabe, V. Scherer, S. Hirsekorn, and W. Arnold, Journal of Vacuum Science & Technology B 15, 1506-1511 (1997).

K. Yamanaka, H. Ogiso, and O. Kolosov, Applied Physics Letters 64, 178-180 (1994).

Kazushi Yamonaka et al, Japanese J. Apple Phys. vol. 34, Part t, No. 5B, pp 2879-2882, May 1995.

D. D. Koleske et al; Rev. Ser, Int., vol. 66, No. 9, pp. 4566-4574, September 1995.

T. Goddenhenrich et al., Rev. Sci. Instrum. 65 (9), Sep. 1994, pp. 2870-2873.

Sahin et al., Transducers '03, The 12th International Conference on Solid State Sensors, Actuators and Microsystems, Boston, June 8-12, 2003, pp. 1124-1127.

Sahin et al., Applied Physics Letters, vol. 79, No. 26, Dec. 24, 2001, pp. 4455-4457.

Stark et al., Applied Physics Letters, vol. 74, No. 22, May 31, 1999, pp. 3296-3298.

Hillenbrand et al., Applied Physics Letters, vol. 26, No. 23, June 5, 2000, pp. 3478-3480.

Rabe et al., Surface and Interface Analysis, 2002, vol. 33, pp. 65-70.

Stark et al., PNAS, June 25, 2002, vol. 99, No. 13, pp. 8473-8478.

Stark et al., Review of Scientific Instruments," December 2003, pp. 5111-5114, vol. 74, No. 12, pp. 5111-5114.

D. Ziegler et al., Nanotechnology 18 225505 (2007).

BACKGROUND OF THE INVENTION

For the sake of convenience, the current description focuses on systems and techniques that may be realized in a particular embodiment of cantilever-based instruments, the atomic force microscope (AFM). Cantilever-based instruments include such instruments as AFMs, molecular force probe instruments (1D or 3D), high-resolution profilometers (including mechanical stylus profilometers), surface modification instruments, chemical or biological sensing probes, and micro-actuated devices. The systems and techniques described herein may be realized in such other cantilever-based instruments.

An AFM is a device used to produce images of surface topography (and/or other sample characteristics) based on information obtained from scanning (e.g., rastering) a sharp probe on the end of a cantilever relative to the surface of the sample. Topographical and/or other features of the surface are detected by detecting changes in deflection and/or oscillation characteristics of the cantilever (e.g., by detecting small changes in deflection, phase, frequency, etc., and using feedback to return the system to a reference state). By scanning the probe relative to the sample, a "map" of the sample topography or other sample characteristics may be obtained.

Changes in deflection or in oscillation of the cantilever are typically detected by an optical lever arrangement whereby a light beam is directed onto the cantilever in the same reference frame as the optical lever. The beam reflected from the cantilever illuminates a position sensitive detector (PSD). As the deflection or oscillation of the cantilever changes, the position of the reflected spot on the PSD changes, causing a change in the output from the PSD. Changes in the deflection or oscillation of the cantilever are typically made to trigger a change in the vertical position of the cantilever base relative to the sample (referred to herein as a change in the Z position, where Z is generally orthogonal to the XY plane defined by the sample), in order to maintain the deflection or oscillation at a constant pre-set value. It is this feedback that is typically used to generate an AFM image.

AFMs can be operated in a number of different sample characterization modes, including contact mode where the tip of the cantilever is in constant contact with the sample surface, and AC modes where the tip makes no contact or only intermittent contact with the surface.

Actuators are commonly used in AFMs, for example to raster the probe or to change the position of the cantilever base relative to the sample surface. The purpose of actuators is to provide relative movement between different parts of the AFM; for example, between the probe and the sample. For different purposes and different results, it may be useful to actuate the sample, the cantilever or the tip or some combination of both. Sensors are also commonly used in AFMs. They are used to detect movement, position, or other attributes of various components of the AFM, including movement created by actuators.

For the purposes of the specification, unless otherwise specified, the term "actuator" refers to a broad array of devices that convert input signals into physical motion, including piezo activated flexures, piezo tubes, piezo stacks, blocks, bimorphs, unimorphs, linear motors, electrostrictive actuators, electrostatic motors, capacitive motors, voice coil actuators and magnetostrictive actuators, and the term "position sensor" or "sensor" refers to a device that converts a physical parameter such as displacement, velocity or acceleration into one or more signals such as an electrical signal, including capacitive sensors, inductive sensors (including eddy current sensors), differential transformers (such as described in co-pending applications US20020175677A1 and US20040075428A1, Linear Variable Differential Transformers for High Precision Position Measurements, and US20040056653A1, Linear Variable Differential Transformer with Digital Electronics, which are hereby incorporated by reference in their entirety), variable reluctance, optical interferometry, optical deflection detectors (including those referred to above as a PSD and those described in co-pending applications US20030209060A1 and US20040079142A1, Apparatus and Method for Isolating and Measuring Movement in Metrology Apparatus, which are hereby incorporated by reference in their entirety), strain gages, piezo sensors, magnetostrictive and electrostrictive sensors.

In both the contact and AC sample-characterization modes, the interaction between the stylus and the sample surface induces a discernable effect on a probe-based operational parameter, such as the cantilever deflection, the cantilever oscillation amplitude, the phase of the cantilever oscillation relative to the drive signal driving the oscillation or the frequency of the cantilever oscillation, all of which are detectable by a sensor. In this regard, the resultant sensor-generated signal is used as a feedback control signal for the Z actuator to maintain a designated probe-based operational parameter constant.

In contact mode, the designated parameter may be cantilever deflection. In AC modes, the designated parameter may be oscillation amplitude, phase or frequency. The feedback signal also provides a measurement of the sample characteristic of interest. For example, when the designated parameter in an AC mode is oscillation amplitude, the feedback signal may be used to maintain the amplitude of cantilever oscillation constant to measure changes in the height of the sample surface or other sample characteristics.

The periodic interactions between the tip and sample in AC modes induces cantilever flexural motion at higher frequencies. Measuring the motion allows interactions between the tip and sample to be explored. A variety of tip and sample mechanical properties including conservative and dissipative interactions may be explored. Stark, et al., have pioneered analyzing the flexural response of a cantilever at higher frequencies as nonlinear interactions between the tip and the sample. In their experiments, they explored the amplitude and phase at numerous higher oscillation frequencies and related these signals to the mechanical properties of the sample.

Unlike the plucked guitar strings of elementary physics classes, cantilevers normally do not have higher oscillation frequencies that fall on harmonics of the fundamental frequency. The first three modes of a simple diving board cantilever, for example, are at the fundamental resonant frequency ($f_0$), $6.19f_0$ and $17.5\ f_0$. An introductory text in cantilever mechanics such as Sarid has many more details. Through careful engineering of cantilever mass distributions, Sahin, et al., have developed a class of cantilevers whose higher modes do fall on higher harmonics of the fundamental resonant frequency. By doing this, they have observed that cantilevers driven at the fundamental exhibit enhanced contrast, based on their simulations on mechanical properties of the sample surface. This approach is has the disadvantage of requiring costly and difficult to manufacture special cantilevers.

The simple harmonic oscillator (SHO) model gives a convenient description at the limit of the steady state amplitude of the eigenmode A of a cantilever oscillating in an AC mode:

$$A = \frac{F_0/m}{\sqrt{(\omega_0^2 - \omega^2)^2 - (\omega\omega_0/Q)^2}}, \qquad \text{SHOAmp0}$$

where $F_0$ is the drive amplitude (typically at the base of the cantilever), m is the mass, $\omega$ is the drive frequency in units of rad/sec, $\omega_0$ is the resonant frequency and Q is the "quality" factor, a measure of the damping.

If, as is often the case, the cantilever is driven through excitations at its base, the expression becomes $$A = \frac{A_{drive}\omega_0^2}{\sqrt{(\omega_0^2 - \omega^2) - (\omega_0\omega/Q)^2}}, \qquad \text{SHOAmpl}$$

where $F_0/m$ has been replaced with $A_{drive}\omega_0^2$, where $A_{drive}$ is the drive amplitude (at the oscillator).

The phase angle $\phi$ is described by an associated equation $$\varphi = \tan^{-1}\left[\frac{\omega\omega_0}{Q(\omega_0^2 - \omega^2)}\right]. \qquad \text{SHOPhase}$$

When these equations are fulfilled, the amplitude and phase of the cantilever are completely determined by the user's choice of the drive frequency and three independent parameters: $A_{drive}$, $\omega_0$ and Q.

In some very early work, Martin, et al., drove the cantilever at two frequencies. The cantilever response at the lower, non-resonant frequency was used as a feedback signal to control the surface tracking and produced a topographic image of the surface. The response at the higher frequency was used to characterize what the authors interpreted as differences in the non-contact forces above the Si and photoresist on a patterned sample.

Recently, Rodriguez and Garcia published a theoretical simulation of a non-contact, attractive mode technique where the cantilever was driven at its two lowest eigen frequencies.

In their simulations, they observed that the phase of the second mode had a strong dependence on the Hamaker constant of the material being imaged, implying that this technique could be used to extract chemical information about the surfaces being imaged. Crittenden et al. have explored using higher harmonics for similar purposes.

There are a number of modes where the instrument is operated in a hybrid mode where a contact mode feedback loop is maintained while some parameter is modulated. Examples include force modulation and piezo-response imaging.

Force modulation involves maintaining a contact mode feedback loop while also driving the cantilever at a frequency and then measuring its response. When the cantilever makes contact with the surface of the sample while being so driven, its resonant behavior changes significantly. The resonant frequency typically increases, depending on the details of the contact mechanics. In any event, one may learn more about the surface properties because force modulation is sensitive to the elastic response of the sample surface. In particular, dissipative interactions may be measured by measuring the phase of the cantilever response with respect to the drive.

A well-known shortcoming of force modulation and other contact mode techniques is that the while the contact forces may be controlled well, other factors affecting the measurement may render it ill-defined. In particular, the contact area of the tip with the sample, usually referred to as contact stiffness, may vary greatly depending on tip and sample properties. This in turn means that the change in resonance while maintaining a contact mode feedback loop, which may be called the contact resonance, is ill-defined. It varies depending on the contact stiffness. This problem has resulted in prior art techniques avoiding operation at or near resonance.

SUMMARY OF THE INVENTION

Cantilevers are continuous flexural members with a continuum of vibrational modes. The present invention describes different apparatus and methods for exciting the cantilever simultaneously at two or more different frequencies and the useful information revealed in the images and measurements resulting from such methods. Often, these frequencies will be at or near two or more of the cantilever vibrational eigenmodes Past work with AC mode AFMs has been concerned with higher vibrational modes in the cantilever, with linear interactions between the tip and the sample. The present invention, however, is centered around non-linear interactions between the tip and sample that couple energy between two or more different cantilever vibrational modes, usually kept separate in the case of linear interactions. Observing the response of the cantilever at two or more different vibrational modes has some advantages in the case of even purely linear interactions however. For example, if the cantilever is interacting with a sample that has some frequency dependent property, this may show itself as a difference in the mechanical response of the cantilever at the different vibrational modes.

BRIEF DESCRIPTION OF THE DRAWINGS

FIGS. 10A-10D and 11 Images of a piezoelectric sample when the cantilever potential was driven at two different frequencies, one slightly below and the other slightly above the same contact resonance frequency.

FIG. 17-19 Images of a piezoelectric sample when the cantilever potential was driven at two different frequencies, one slightly below and the other slightly above the same contact resonance frequency.

DESCRIPTION OF THE PREFERRED EMBODIMENTS

Figure 1:
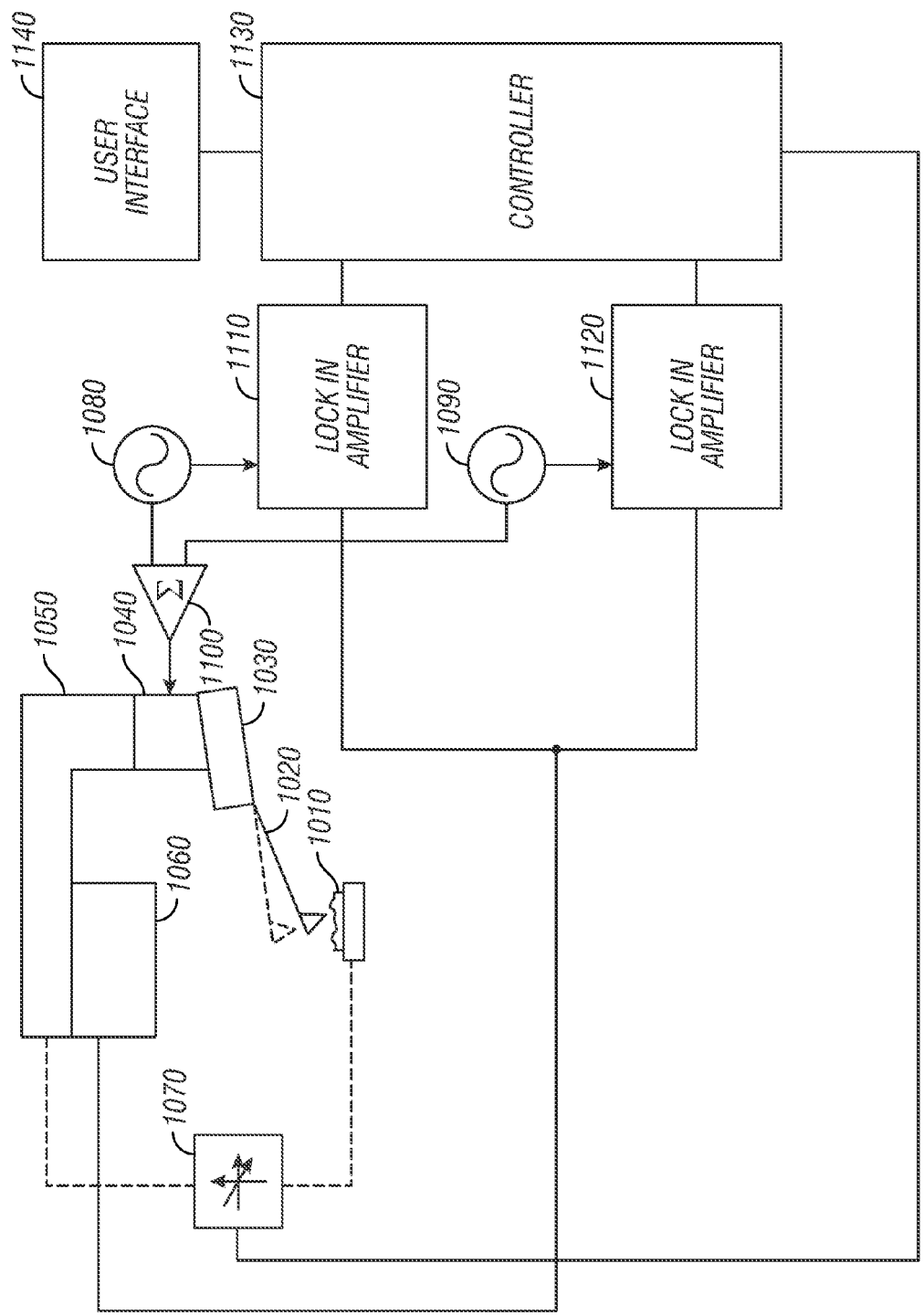
FIG. 1 Preferred embodiment for probing multiple eigenmodes of a cantilever.

FIG. 1 is a block diagram of a preferred embodiment of an apparatus for probing multiple eigenmodes of a cantilever in accordance with the present invention. The sample 1010 is positioned below the cantilever probe 1020. The chip 1030 of the cantilever probe 1020 is driven by a mechanical actuator 1040, preferably a piezoelectric actuator, but other methods to induce cantilever motion known to those versed in the art could also be used. The motion of the cantilever probe 1020 relative to the frame of the microscope 1050 is measured with a detector 1060, which could be an optical lever or another method known to those versed in the art. The cantilever chip 1030 is moved relative to the sample 1010 by a scanning apparatus 1070, preferably a piezo/flexure combination, but other methods known to those versed in the art could also be used.

The motion imparted to the cantilever chip 1030 by actuator 1040 is controlled by excitation electronics that include at least two frequency synthesizers 1080 and 1090. There could be additional synthesizers if more than two cantilever eigenmodes are to be employed. The signals from these frequency synthesizers could be summed together by an analog circuit element 1100 or, preferably, a digital circuit element that performs the same function. The two frequency synthesizers 1080 and 1090 provide reference signals to lockin amplifiers 1110 and 1120, respectively. In the case where more than two eigenmodes are to be employed, the number of lockin amplifiers will also be increased. As with other electronic components in this apparatus, the lockin amplifiers 1110 and 1120 can be made with analog circuitry or with digital circuitry or a hybrid of both. For a digital lockin amplifier, one interesting and attractive feature is that the lockin analysis can be performed on the same data stream for both eigenmodes. This implies that the same position sensitive detector and analog to digital converter can be used to extract information at the two distinct eigenmodes.

The lockin amplifiers could also be replaced with rms measurement circuitry where the rms amplitude of the cantilever oscillation is used as a feedback signal.

There are a number of variations in the FIG. 1 apparatus that a person skilled in the art could use to extract information relative to the different eigenmodes employed in the present invention. Preferably, a direct digital synthesizer (DDS) could be used to create sine and cosine quadrature pairs of oscillating voltages, each at a frequency matched to the eigenmodes of the cantilever probe 1030 that are of interest. This implementation also allows dc voltages to be applied, allowing methods such as scanning Kelvin probing or simultaneous current measurements between the tip and the sample. The amplitude and phase of each eigenmode can be measured and used in a feedback loop calculated by the controller 1130 or simply reported to the user interface 1140 where it is displayed, stored and/or processed further in an off-line manner. Instead of, or in addition to, the amplitude and phase of the cantilever motion, the quadrature pairs, usually designated x and y, can be calculated and used in a manner similar to the amplitude and phase.

In one method of using the FIG. 1 apparatus, the cantilever is driven at or near two or more resonances by the single "shake" piezo 1040. Operating in a manner similar to AC mode where the cantilever amplitude is maintained constant and used as a feedback signal, but employing the teachings of the present invention, there are now a number of choices for the feedback loop. Although the work here will focus on using the amplitude of the fundamental ($A_0$), we were able to successfully image using one of the higher mode amplitudes ($A_i$) as a feedback signal as well as a sum of all the amplitudes $A_0+A_1+\ldots$. One can also choose to exclude one or more modes from such a sum. So for example, where three modes are employed, the sum of the first and second could be used to operate the feedback loop and the third could be used as a carry along signal.

Because higher eigenmodes have a significantly higher dynamic stiffness, the energy of these modes can be much larger that that of lower eigenmodes.

The method may be used to operate the apparatus with one flexural mode experiencing a net attractive force and the other a net repulsive force, as well as operating with each mode experiencing the same net sign of force, attractive or repulsive. Using this method, with the cantilever experiencing attractive and repulsive interactions in different eigenmodes, may provide additional information about sample properties.

One preferred technique for using the aforesaid method is as follows. First, excite the probe tip at or near a resonant frequency of the cantilever keeping the tip sufficiently far from the sample surface that it oscillates at the free amplitude $A_{10}$ unaffected by the proximity of the cantilever to the sample surface and without making contact with the sample surface. At this stage, the cantilever is not touching the surface; it turns around before it interacts with significant repulsive forces.

Second, reduce the relative distance in the Z direction between the base of the cantilever and the sample surface so that the amplitude of the probe tip $A_1$ is affected by the proximity of the sample surface without the probe tip making contact with the sample surface. The phase $p_1$ will be greater than $p_{10}$, the free first eigenmode phase. This amplitude is maintained at an essentially constant value during scanning without the probe tip making contact with the sample surface by setting up a feedback loop that controls the distance between the base of the cantilever and the sample surface.

Third, keeping the first eigenmode drive and surface controlling feedback loop with the same values, excite a second eigenmode of the cantilever at an amplitude $A_2$. Increase $A_2$ until the second eigenmode phase $p_2$ shows that the cantilever eigenmode is interacting with predominantly repulsive forces; that is, that $p_2$ is less than $p_{20}$, the free second eigenmode phase. This second amplitude $A_2$ is not included in the feedback loop and is allowed to freely roam over a large range of values. In fact, it is typically better if variations in $A_2$ can be as large as possible, ranging from 0 to $A_{20}$, the free second eigenmode amplitude.

Fourth, the feedback amplitude and phase, $A_1$ and $p_1$, respectively, as well as the carry along second eigenmode amplitude and phase, $A_2$ and $p_2$, respectively, should be measured and displayed.

Alternatively, the drive amplitude and/or phase of the second frequency can be continually adjusted to maintain the second amplitude and/or phase at an essentially constant value. In this case, it is useful to display and record the drive amplitude and/or frequency required to maintain the second amplitude and/or phase at an essentially constant value.

A second preferred technique for using the aforesaid method follows the first two steps of first preferred technique just described and then continues with the following two steps:

Third, keeping the first eigenmode drive and surface controlling feedback loop with the same values, excite a second eigenmode (or harmonic) of the cantilever at an amplitude $A_2$. Increase $A_2$ until the second eigenmode phase $p_2$ shows that the cantilever eigenmode is interacting with predominantly repulsive forces; that is, that $p_2$ is less than $p_{20}$, the free second eigenmode phase. At this point, the second eigenmode amplitude $A_2$ should be adjusted so that the first eigenmode phase $p_1$ becomes predominantly less than $p_{10}$, the free first eigenmode phase. In this case, the adjustment of the second eigenmode amplitude $A_2$ has induced the first eigenmode of the cantilever to interact with the surface in a repulsive manner. As with the first preferred technique, the second eigenmode amplitude $A_2$ is not used in the tip-surface distance feedback loop and should be allowed range widely over many values.

Fourth, the feedback amplitude and phase, $A_1$ and $p_1$, respectively, as well as the carry along second eigenmode amplitude and phase, $A_2$ and $p_2$, respectively, should be measured and displayed.

Either of the preferred techniques just described could be performed in a second method of using the FIG. 1 apparatus where the phase of the oscillating cantilever is used in a feedback loop and the oscillation frequency is varied to maintain phase essentially constant. In this case, it is preferable to use the oscillation frequency as an input into a z-feedback loop that controls the cantilever-sample separation.

Relative changes in various parameters such as the amplitude and phase or in-phase and quadrature components of the cantilever at these different frequencies could also be used to extract information about the sample properties.

A third preferred technique for using the aforesaid method provides an alternative for conventional operation in a repulsive mode, that is where the tip is experiencing a net repulsive force. The conventional approach for so operating would be to use a large amplitude in combination with a lower setpoint, and a cantilever with a very sharp tip. Using this third preferred technique, however, the operator begins, just as with the first two techniques, by choosing an amplitude and setpoint for the fundamental eigenmode that is small enough to guarantee that the cantilever is experiencing attractive forces, that is, that the cantilever is in non-contact mode. As noted before, this operational mode can be identified by observing the phase of the cantilever oscillation. In the non-contact case, the phase shift is positive, implying that the resonant frequency has been lowered. With these conditions on the first eigenmode, the second eigenmode excitation can be introduced and the amplitude, drive frequency and, if applicable, set point chosen with the following considerations in mind:

1. Both eigenmodes are in the attractive mode, that is to say that the phase shift of both modes is positive, implying both eigenmode frequencies have been shifted negatively by the tip-sample interactions. Generally, this requires a small amplitude for the second eigenmode.
2. The fundamental eigenmode remains attractive while the second eigenmode is in a state where the tip-sample interactions cause it to be in both the attractive and the repulsive modes as it is positioned relative to the surface.
3. The fundamental eigenmode is in an attractive mode and the second eiegenmode is in a repulsive mode.
4. In the absence of any second mode excitation, the first eigenmode is interacting with the surface in the attractive mode. After the second eigenmode is excited, the first eigenmode is in a repulsive mode. This change is induced by the addition of the second eigenmode energy. The second eigenmode is in a state where the tip-sample interactions cause it to be attractive and/or repulsive.
5. The first eigenmode is in a repulsive mode and the second mode is in a repulsive mode.

Figure 4:
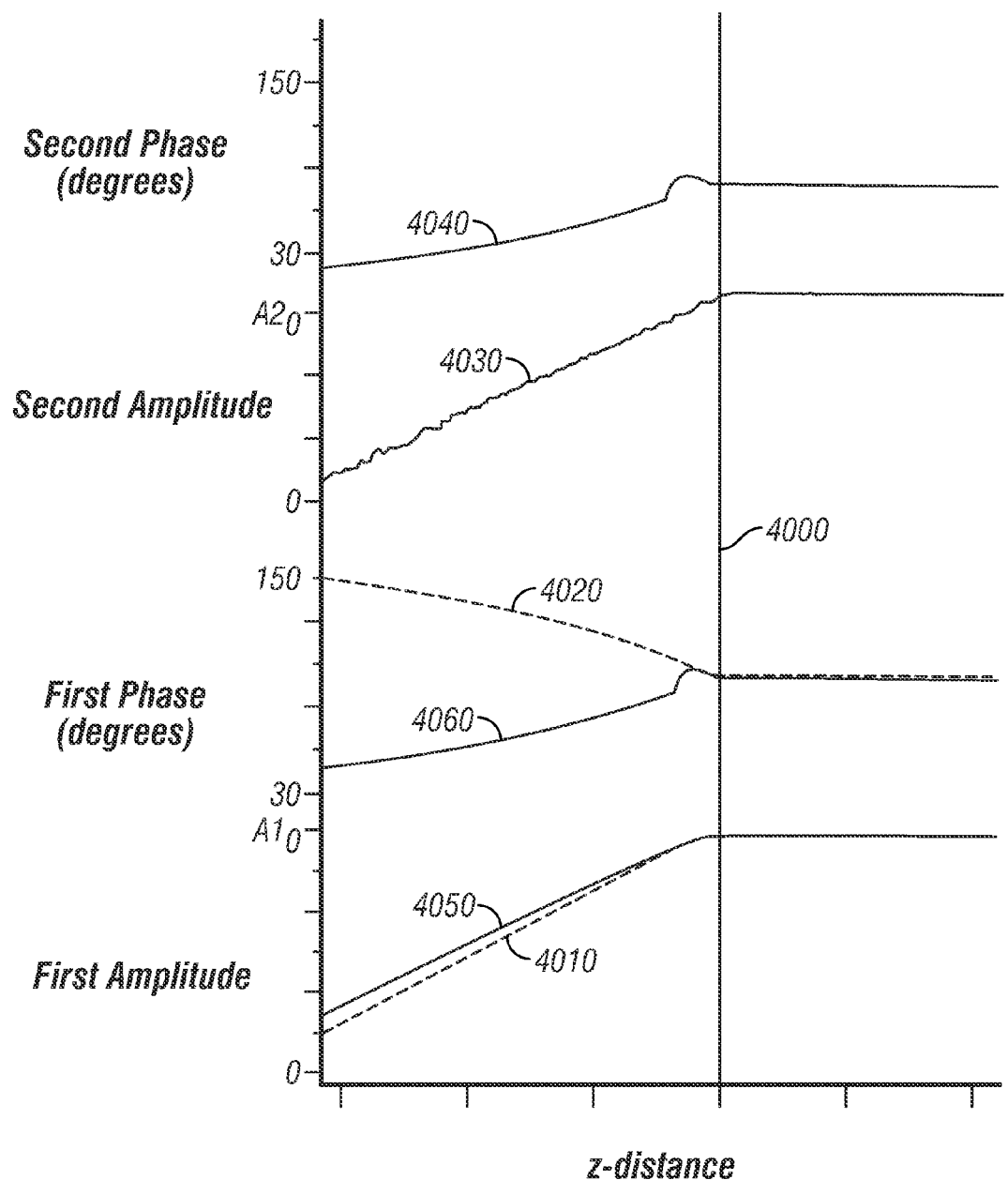
FIG. 4 Phase and amplitude shifts of the fundamental eigenmode with and without the second eigenmode being driven.
Figure 5A:
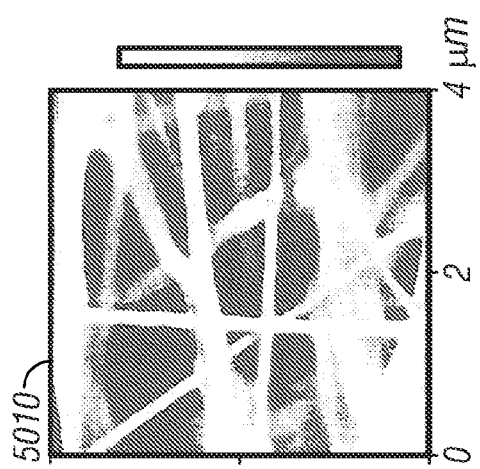
FIG. 5A-5E Images of collagen fibers taken with the preferred embodiment.
Figure 5B:
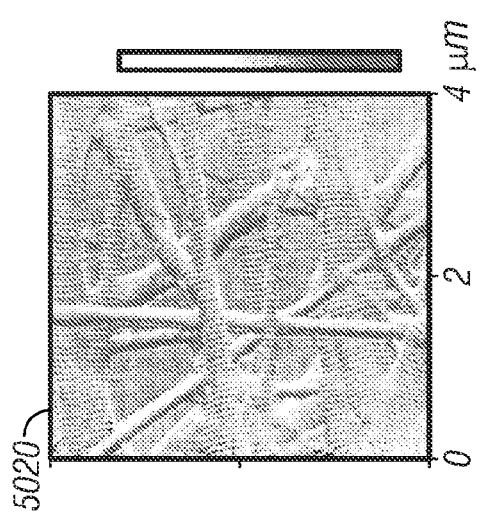
Figure 5C:
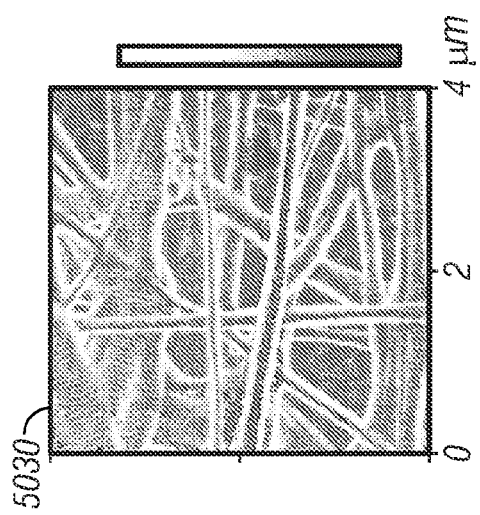
Figure 5D:
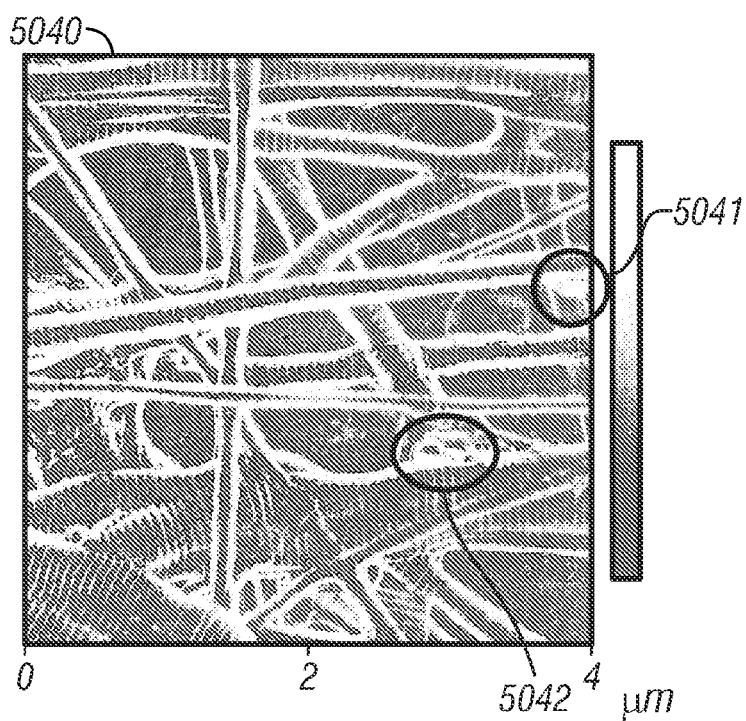
Figure 5E:
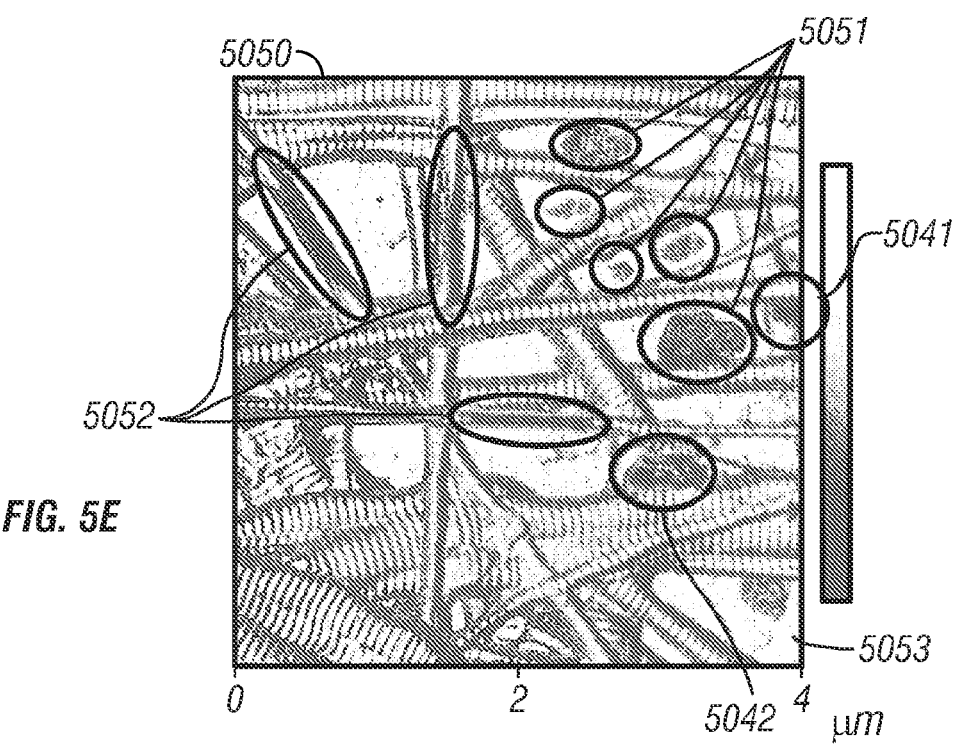

The transition from attractive to repulsive mode in the first eigenmode, as induced by the second eigenmode excitation, is illustrated in FIG. 4, where the amplitude and phase of the first and second eigenmodes are plotted as a function of the distance between the base of the cantilever and the surface of the sample. The point where the tip begins to interact significantly with the surface is indicated with a solid line 4000. The fundamental amplitude 4010 of the cantilever decreases as the cantilever starts to interact with the surface, denoted by the solid line 4000. The associated phase 4020 shows a positive shift, consistent with overall attractive interactions. For these curves, the second eigenmode amplitude is zero and therefore not plotted in the Figure (and neither is phase, for the same reason). Next, the second eigenmode is excited and the same curves are re-measured, together with the amplitude and phase of the second eigenmode, 4030 and 4040. There is a notable change in the fundamental eigenmode amplitude 4050 and more strikingly, the fundamental eigenmode phase 4060. The fundamental phase in fact shows a brief positive excursion, but then transitions to a negative phase shift, indicating an overall repulsive interaction between the tip and sample. The free amplitude of the first eigenmode is identical in both cases, the only difference in the measurement being the addition of energy exciting the higher oscillatory eigenmode. This excitation is sufficient to drive the fundamental eigenmode into repulsive interactions with the sample surface. Furthermore, the phase curve of the second eigenmode indicates that it is also interacting overall repulsively with the sample surface.

More complicated feedback schemes can also be envisioned. For example, one of the eigenmode signals can be used for topographical feedback while the other signals could be used in other feedback loops. An example would be that $A_1$ is used to control the tip-sample separation while a separate feedback loop was used to keep $A_2$ at an essentially constant value rather than allowing it to range freely over many values. A similar feedback loop could be used to keep the phase of the second frequency drive $p_2$ at a predetermined value with or without the feedback loop on $A_2$ being implemented.

As another example of yet another type of feedback that could be used, Q-control can also be used in connection with any of the techniques for using the aforesaid method. Using Q-control on any or all of the eigenmodes employed can enhance their sensitivity to the tip-sample forces and therefore mechanical or other properties of the sample. It can also be used to change the response time of the eigenmodes employed which may be advantageous for more rapidly imaging a sample. For example, the value of Q for one eigenmode could be increased and the value for another decreased. This may enhance the result of mixed attractive/repulsive mode imaging because it is generally easier to keep one eignmode interacting with the sample in repulsive mode with a reduced Q-value or, conversely, in attractive mode with an enhanced Q-value. By reducing the Q-value of the lowest eigenmode and enhancing the Q-value of the next eigenmode, it is possible to encourage the mixed mode operation of the cantilever; the zeroth eigenmode will be in repulsive mode while the first eigenmode will more likely remain in attractive mode. Q-control can be implemented using analog, digital or hybrid analog-digital electronics. It can be accomplished using an integrated control system such as that in the Asylum Research Corporation MFP-3D Controller or by after-market modules such as the nanoAnalytics Q-box.

In addition to driving the cantilever at or near more than one eigenmode, it is possible to also excite the cantilever at or near one or more harmonics and/or one or more eigenmodes. It has been known for some time that nonlinear interactions between the tip and the sample can transfer energy into cantilever harmonics. In some cases this energy transfer can be large but it is usually quite small, on the order of a percent of less of the energy in the eigenmode. Because of this, the amplitude of motion at a harmonic, even in the presence of significant nonlinear coupling is usually quite small. Using the methods described here, it is possible to enhance the contrast of these harmonics by directly driving the cantilever at the frequency of the harmonic. To further enhance the contrast of this imaging technique it is useful to adjust the phase of the higher frequency drive relative to that of the lower. This method improves the contrast of both conventional cantilevers and the specially engineered "harmonic" cantilevers described by Sahin et al and other researchers.

On many samples, the results of imaging with the present invention are similar to, and in some cases superior to, the results of conventional phase imaging. However, while phase imaging often requires a judicious choice of setpoint and drive amplitude to maximize the phase contrast, the method of the present invention exhibits high contrast over a much wider range of imaging parameters.

Moreover, the method also works in fluid and vacuum, as well as air and the higher flexural modes show unexpected and intriguing contrast in those environments, even on samples such as DNA and cells that have been imaged numerous times before using more conventional techniques.

Although there is a wide range of operating parameters that yield interesting and useful data, there are situations where more careful tuning of the operational parameters will yield enhanced results. Some of these are discussed below. Of particular interest can be regions in set point and drive amplitude space where there is a transition from attractive to repulsive (or vice versa) interactions in one or more of the cantilever eigenmodes or harmonics.

The superior results of imaging with the present invention may be seen from an inspection of the images. An example is shown in FIG. 5. For this example, the FIG. 1 apparatus was operated using the fundamental eignemode amplitude as the error signal and the second eigenmode as a carry-along signal. The topography image 5010 in FIG. 5 shows collagen fibers on a glass surface, an image typical of results with conventional AC mode from similar samples. The fundamental eigenmode amplitude image 5020 is relatively similar, consistent with the fundamental eignemode amplitude being used in the feedback loop. The fundamental eigenmode phase channel image 5030 shows some contrast corresponding to edges in the topography image. This is consistent with the interaction being more attractive at these regions, again to be expected from surface energy considerations (larger areas in proximity will have larger long-range attractive forces). Since the fundamental eignemode amplitude is being held relatively constant and there is a relationship between the amplitude and phase, the phase will be constrained, subject to energy balance and the feedback loop that is operating to keep the amplitude constant. The second eigenmode amplitude image 5040 shows contrast that is similar to the fundamental eigenmode phase image 5030. However, there are some differences, especially over regions thought to be contaminants 5041 and 5042. Finally, the second eigenmode phase image 5050 shows the most surprisingly large amount of contrast. The background substrate 5053 shows a bright, positive phase contrast. The putative contaminant patches, 5041, 5042 and 5051 show strikingly dark, negative phase shift contrast. Finally, regions where the collagen fibers are suspended 5052 show dark, negative phase contrast. In these last regions, the suspended collagen fibers are presumably absorbing some of the vibrational energy of the second eigenmode amplitude and thus, changing the response.

When an AFM is operated in conventional amplitude modulated (AM) AC mode with phase detection, the cantilever amplitude is maintained constant and used as a feedback signal. Accordingly, the values of the signal used in the loop are constrained not only by energy balance but also by the feedback loop itself. Furthermore, if the amplitude of the cantilever is constrained, the phase will also be constrained, subject to conditions discussed below. In conventional AC mode it is not unusual for the amplitude to vary by a very small amount, depending on the gains of the loop. This means that, even if there are mechanical properties of the sample that might lead to increased dissipation or a frequency shift of the cantilever, the z-feedback loop in part corrects for these changes and thus in this sense, avoids presenting them to the user.

If the technique for using the present invention involves a mode that is excited but not used in the feedback loop, there will be no explicit constraints on the behavior of this mode. Instead it will range freely over many values of the amplitude and phase, constrained only by energy balance. That is to say, the energy that is used to excite the cantilever motion must be balanced by the energy lost to the tip-sample interactions and the intrinsic dissipation of the cantilever. This may explain the enhanced contrast we observe in images generated with the techniques of the present invention.

Figure 6:
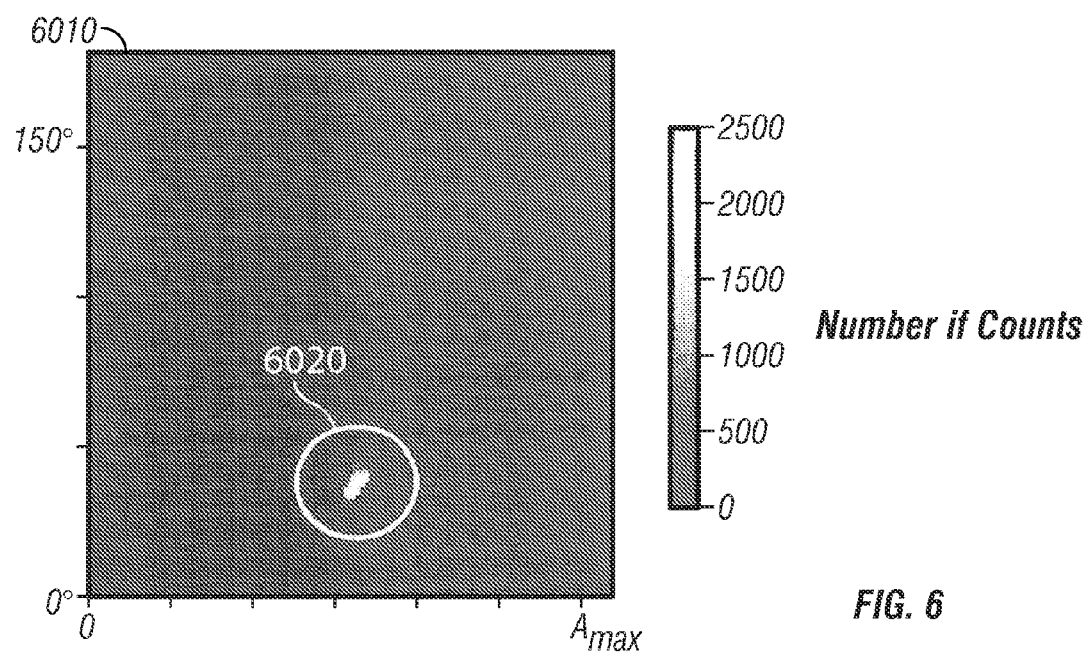
FIGS. 6 and 7 Two dimensional histogram plots of the amplitude and phase for the first and second eigenmodes.
Figure 7:
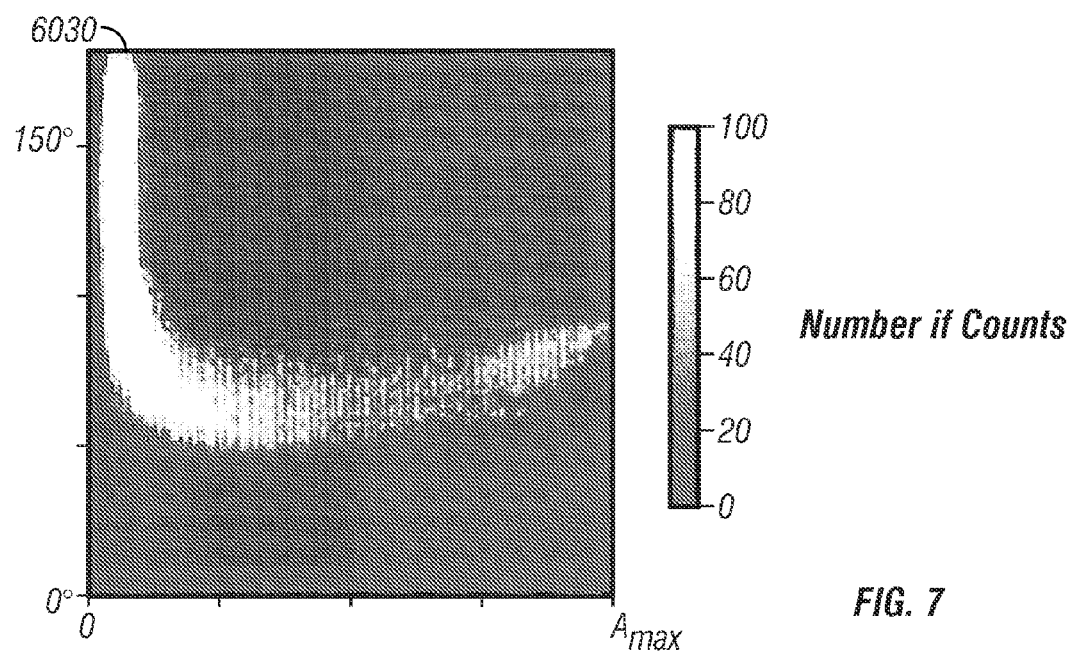

FIG. 6 demonstrates this idea more explicitly. The first image 6010 is an image of the number of pixels at different amplitudes (horizontal axis) and phases (vertical axis) in the fundamental eigenmode data for the collagen sample of FIG. 5. As expected, the amplitude values are constrained to a narrow range around ~0.6Amax by the z-feedback loop. Constraining the amplitude values in turn, limits the values that the phase can take to the narrow range around 25°. Thus, when the pixel counts are plotted, there is a bright spot 6020 with only small variations. Small variations in turn imply limited contrast. The second image 6030 plots the number of pixels at different amplitudes and phases in the second eigenmode data for the collagen sample. Since the amplitude of this eigenmode was not constrained by a feedback loop, it varies from ~Amax to close to zero. Similarly, the phase ranges over many values. This freedom allows greatly increased contrast in the second eigenmode images.

The present invention may also be used in apparatus that induce motion in the cantilever other than through a piezoelectric actuator. These could include direct electric driving of the cantilever ("active cantilevers"), magnetic actuation schemes, ultrasonic excitations, scanning Kelvin probe and electrostatic actuation schemes.

Direct electric driving of the cantilever ("active cantilevers") using the present invention has several advantages over conventional piezo force microscopy (PFM) where the cantilever is generally scanned over the sample in contact mode and the cantilever voltage is modulated in a manner to excite motion in the sample which in turn causes the cantilever to oscillate.

Figure 2:
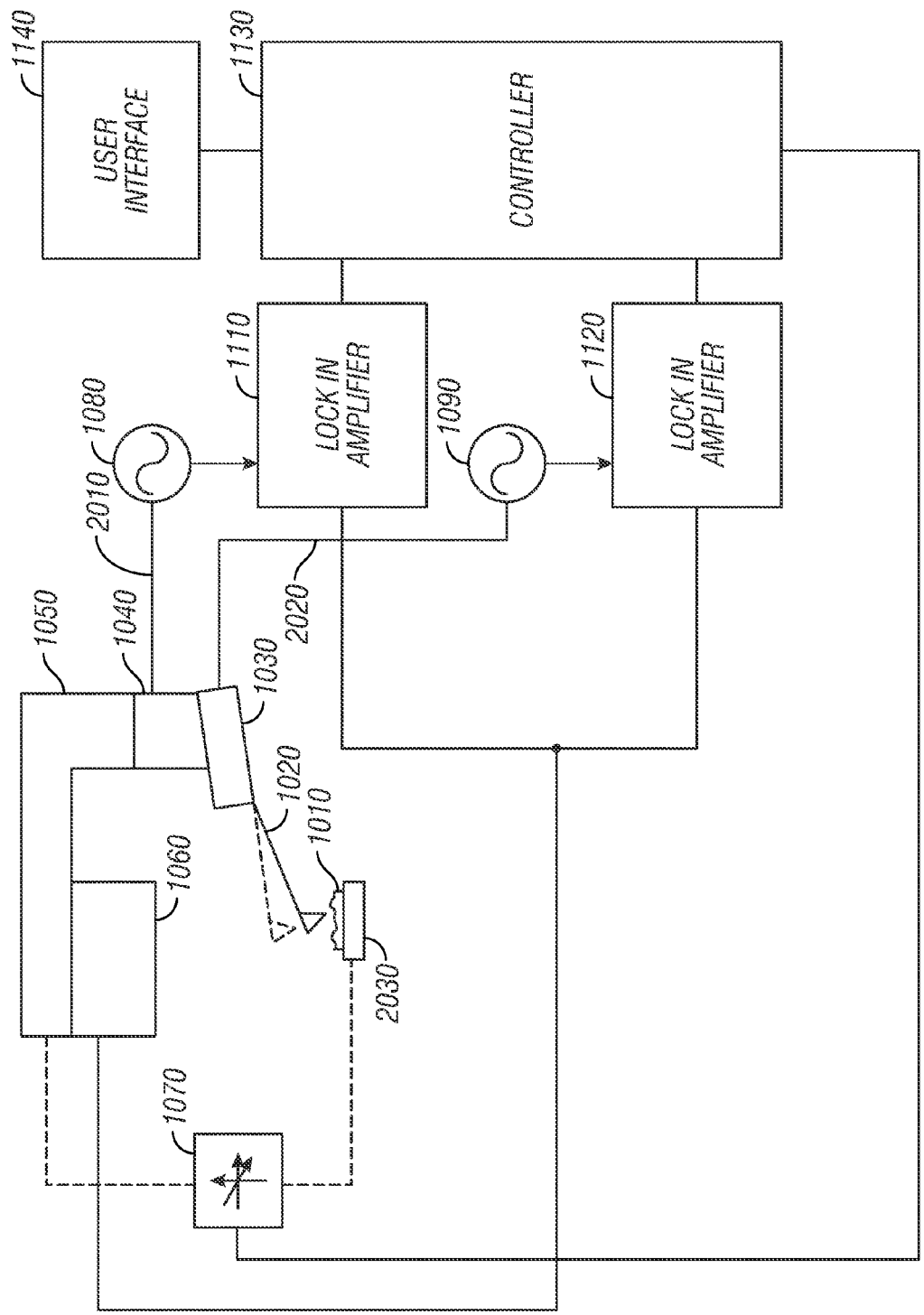
FIG. 2 Preferred embodiment for exciting voltage-dependent motion in the cantilever probe.

FIG. 2 is a block diagram of a preferred embodiment of an apparatus for using the present invention with an active cantilever. This apparatus has similarities to that shown in FIG. 1, as well as differences. In the FIG. 2 apparatus, like the FIG. 1 apparatus, one of the frequency sources 1080 is used to excite motion of the cantilever probe 1020 through a mechanical actuator 1040, preferably a piezoelectric actuator, but other methods to induce cantilever motion known to those versed in the art could also be used, which drives the chip 1030 of the cantilever probe 1020, However, in the FIG. 2 apparatus, the frequency source 1080 communicates directly 2010 with the actuator 1040 instead of being summed together with the second frequency source 1090, as in the FIG. 1 apparatus. The second frequency source 1090 in the FIG. 2 apparatus is used to vary the potential of the cantilever probe 1020 which in turn causes the sample 1010 to excite motion in the cantilever probe 1020 at a different eigenmode than that excited by the first frequency source 1080. The resulting motion of the cantilever probe 1020 interacting with the sample 1010 will contain information on the sample topography and other properties at the eigenmode excited by the first frequency source 1080 and information regarding the voltage dependent properties of the sample at the eigenmode excited by the second frequency source 1090. The sample holder 2030 can optionally be held at a potential, or at ground, to enhance the effect.

In one method of using the FIG. 2 apparatus, the amplitude of the cantilever at the frequency of the first source 1080 is used as the error signal. The amplitude and phase (or in-phase and quadrature components) at the frequency of the second source 1090 or a harmonic thereof will contain information about the motion of the sample and therefore the voltage dependent properties of the sample. One example of these properties is the piezo-response of the sample.

Another is the electrical conductivity, charge or other properties that can result in long range electrostatic forces between the tip and the sample.

Figure 3:
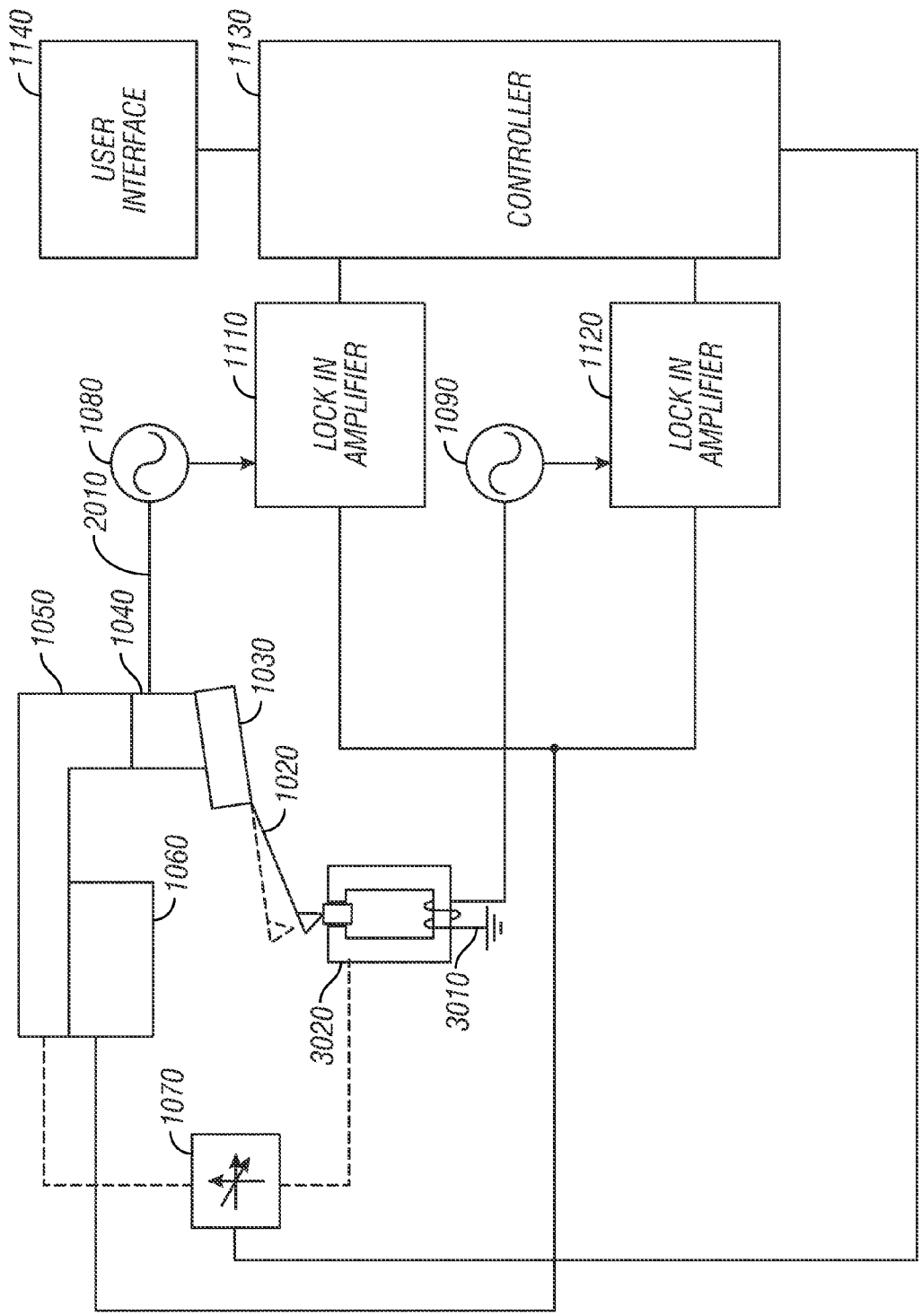
FIG. 3 Preferred embodiment for probing an active device.

FIG. 3 is a block diagram of a preferred embodiment of an apparatus for using the present invention with the second frequency source modulating a magnetic field that changes a property of the surface. In the FIG. 3 apparatus, the situation with the first frequency source 1080 is identical to the situation in the FIG. 2 apparatus. However, instead of the second frequency source 1090 being used to vary the potential of the cantilever probe 1020, as with the FIG. 2 apparatus, in the FIG. 3 apparatus the second frequency source 1090 modulates the current through an excitation coil 3010 which in turn modulates the magnetic state of a magnetic circuit element 3020. Magnetic circuit element 3020 could be used to modulate the field near an active sample or the excitation coil 3010. Alternatively, magnetic circuit element 3020 could comprise the sample, as in the case of a magnetic recording head.

The FIG. 3 apparatus can be used with any other sort of 'active' sample where the interaction between the cantilever and the sample can be modulated at or near one or more of the cantilever flexural resonances by one of the frequency sources 1080 or 1090. This could also be extended to high frequency measurements such as described in Proksch et al., Appl. Phys. Lett., vol. (1999). Instead of the modulation described in that paper, the envelope of the high frequency carrier could be driven with a harmonic of one or more flexural resonances. This method of measuring signals other than topographic has the advantage of requiring only one pass to complete as opposed to "LiftMode" or Nap mode that require temporally separated measurements of the topographic and other signals.

Another example of a preferred embodiment of an apparatus and method for using the present invention is from the field of ultrasonic force microscopy. In this embodiment, one or more eigenmodes are used for the z-feedback loop and one or more additional eigenmodes can be used to measure the high frequency properties of the sample. The high frequency carrier is amplitude modulated and either used to drive the sample directly or to drive it using the cantilever as a waveguide. The cantilever deflection provides a rectified measure of the sample response at the carrier frequency.

Another group of embodiments for the present invention has similarities to the conventional force modulation technique described in the Background to the Invention and conventional PFM where the cantilever is scanned over the sample in contact mode and a varying voltage is applied to the cantilever. In general this group may be described as contact resonance embodiments. However, these embodiments, like the other embodiments already described, make use of multiple excitation signals.

Figure 8:
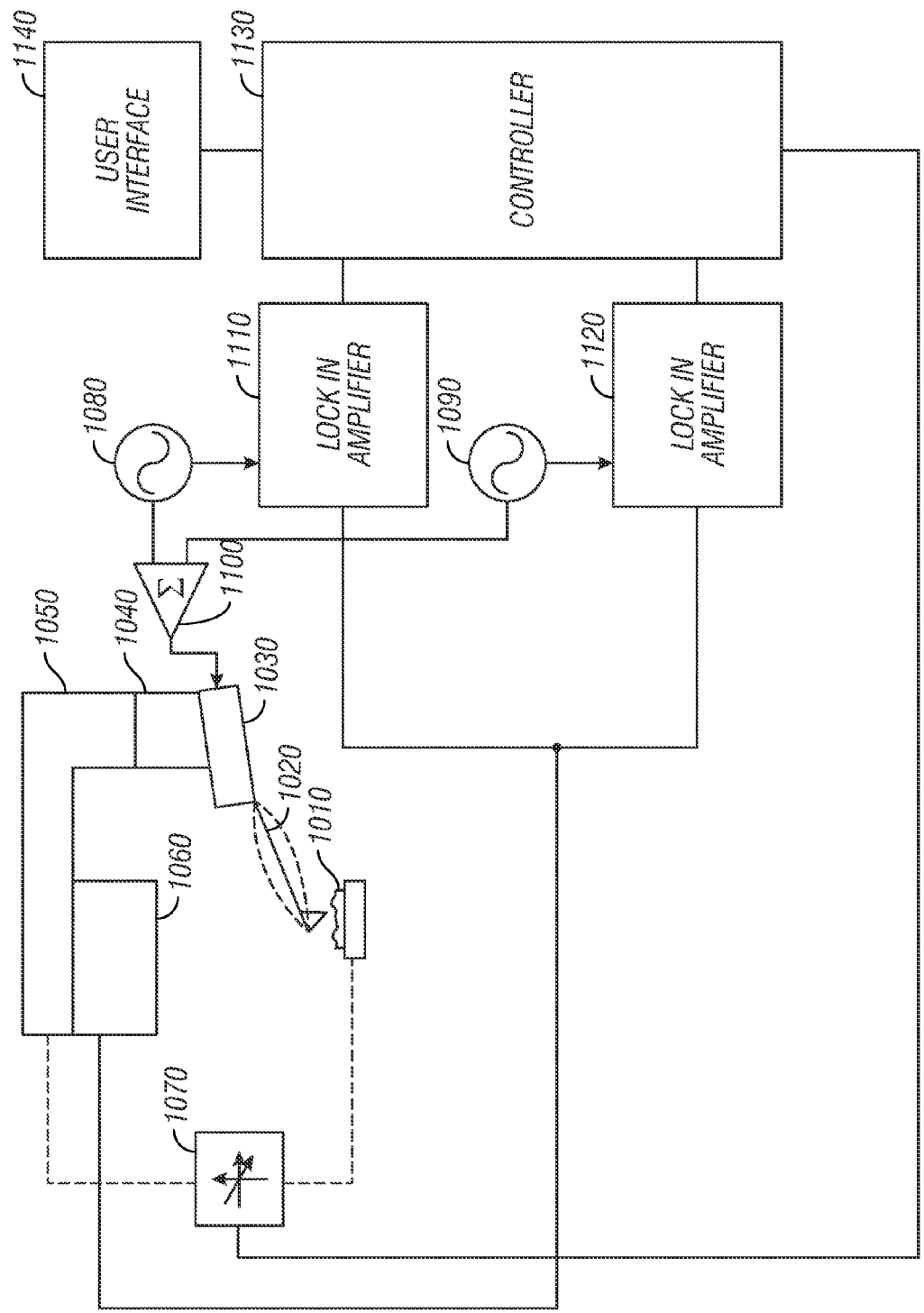
FIG. 8 Preferred embodiment for probing an active sample in contact while measuring dynamic contact properties (Dual Frequency Resonance Tracking Piezo Force Microscopy (DFRT PFM)).

FIG. 8 is a block diagram of the first of these embodiments, which may be referred to as Dual Frequency Resonance Tracking Piezo Force Microscopy (DFRT PFM). In the DFRT PFM apparatus of FIG. 8 the cantilever probe 1020 is positioned above a sample 1010 with piezoelectric properties and scanned relative to the sample 1010 by a scanning apparatus 1070 using contact mode. Unlike conventional contact mode however the chip 1030 of the cantilever probe 1020, or the cantilever probe 1020 itself (alternative not shown), is driven by excitation electronics that include at least two frequency synthesizers 1080 and 1090. The cantilever probe 1020 responds to this excitation by buckling up and down much as a plucked guitar string. The signals from these frequency synthesizers could be summed together by an analog circuit element 1100 or, preferably, a digital circuit element that performs the same function. The two frequency synthesizers 1080 and 1090 provide reference signals to lockin amplifiers 1110 and 1120, respectively. The motion of the cantilever probe 1020 relative to the frame of the microscope 1050 is measured with a detector 1060, which could be an optical lever or another method known to those versed in the art. The cantilever chip 1030 is moved relative to the sample 1010 in order to maintain constant force by a scanning apparatus 1070, preferably a piezo/flexure combination, but other methods known to those versed in the art could also be used. The amplitude and phase of each frequency at which the cantilever probe 1020 is excited can be measured and used in a feedback loop calculated by the controller 1130 or simply reported to the user interface 1140 where it is displayed, stored and/or processed further in an off-line manner. Instead of, or in addition to, the amplitude and phase of the cantilever motion, the quadrature pairs, usually designated x and y, can be calculated and used in a manner similar to the amplitude and phase.

In one method of using the FIG. 8 apparatus, the topography of the sample would be measured in contact mode while the amplitude and phase of the cantilever probe 1020 response to the applied potential at the lowest contact resonance and at the next highest contact resonance is simultaneously measured. The responses can be analyzed to determine whether they originate from the actual piezoelectric response of the sample or from crosstalk between the topography and any electric forces between the tip of the cantilever probe 1020 and the sample. Even more information can be obtained if more frequencies are utilized.

Figure 12:
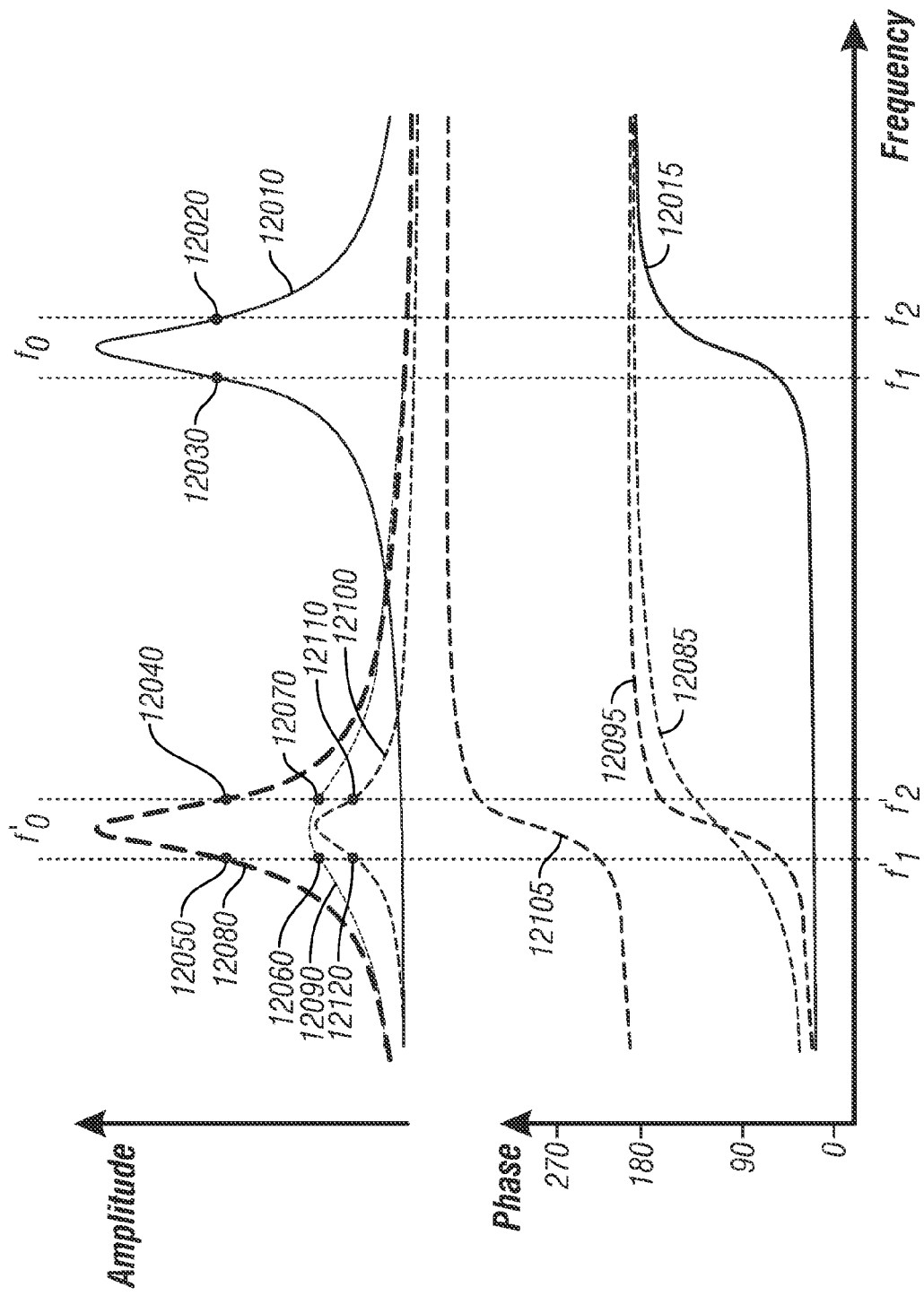
FIG. 12 Amplitude versus frequency and phase versus frequency curves simultaneous measured at different frequencies.

FIG. 12 also shows three examples of the changes in the native phase 12015 and amplitude 12010 of a cantilever with a resonant frequency $f_0$ caused by interactions between the tip and the sample using DFRT PFM methods. These examples are a subset of changes that can be observed. In the first example, the resonant frequency is significantly lowered to $f_0'$ but not damped. The phase 12085 and amplitude 12080 change but little relative to the native phase 12015 and amplitude 12010. In the second example the resonant frequency is again lowered to $f_0'$, this time with damping of the amplitude. Here the phase 12095 is widened and the amplitude 12090 is appreciably flattened. Finally, in the third example, the resonant frequency is again dropped to $f_0'$, this time with a reduction in the response amplitude. This yields a phase curve with an offset 12105 but with the same width as the second case 12095 and a reduced amplitude curve 12100 with the damping equivalent to that of the second example. If there is an offset in the phase versus frequency curve as there is in this third example, prior art phase locked-loop electronics will not maintain stable operation. For example, if the phase set-point was made to be 90 degrees, it would never be possible to find a frequency in curve 12105 where this condition was met. One example of these things occurring in a practical situation is in DRFT PFM when the tip crosses from an electric domain with one orientation to a second domain with another orientation. The response induced by the second domain will typically have a phase offset with respect to the first. This is, in fact where the large contrast in DFRT PFM phase signals originates.

Figure 9:
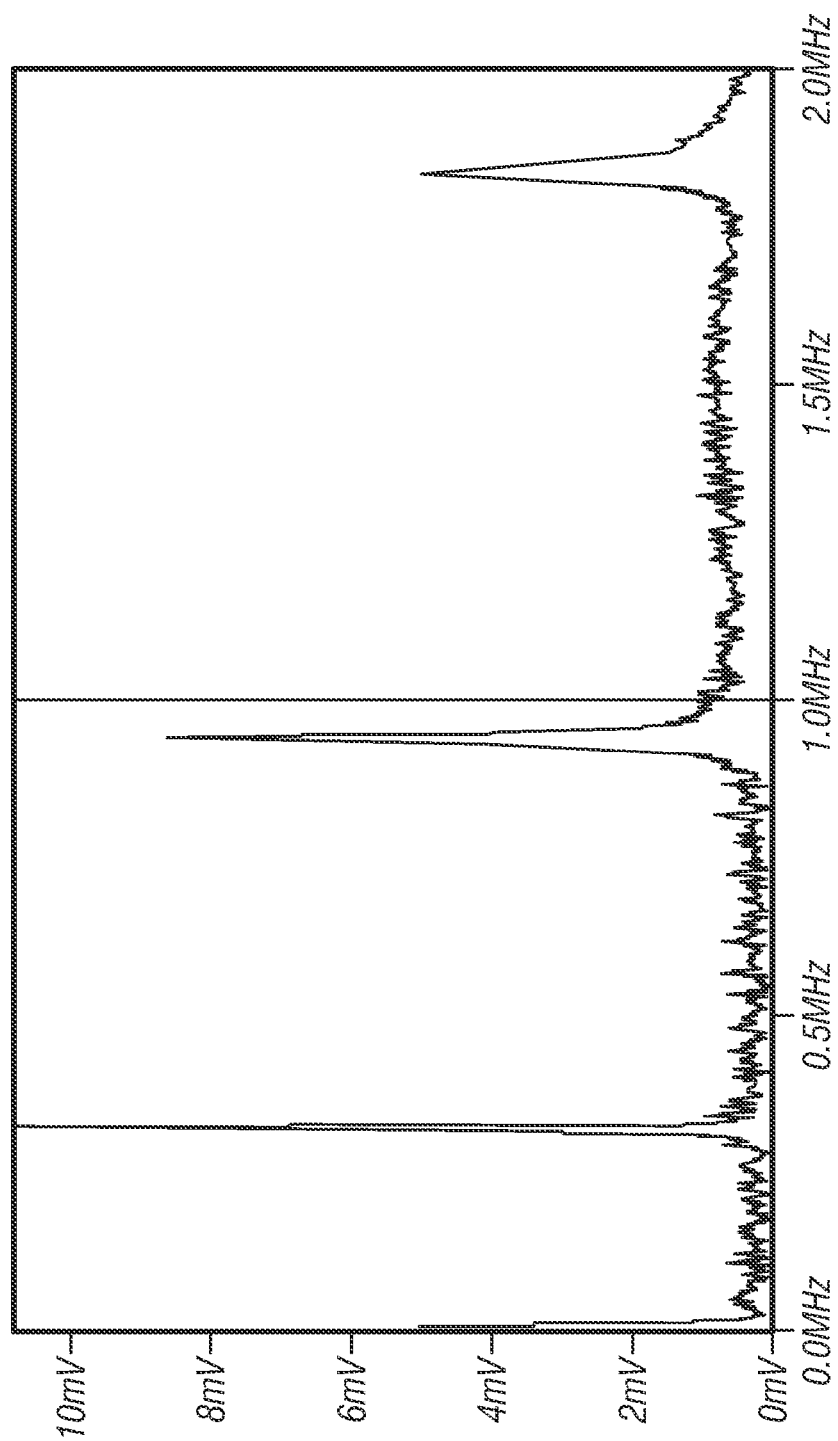
FIG. 9 Resonance peaks in sweep of applied potential from dc to 2 MHz.
Figure 11:
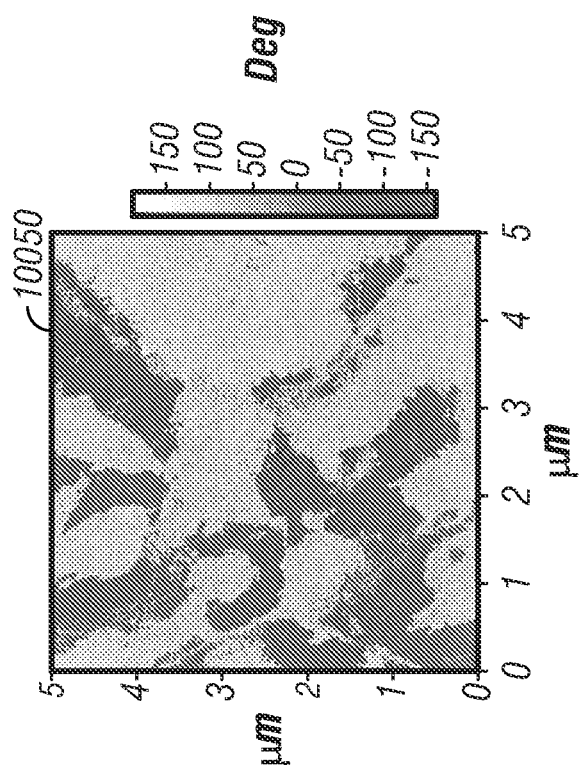

FIG. 9 shows the cantilever response when the applied potential is swept from dc to 2 MHz using the DFRT PFM apparatus. Three resonance peaks are visible. Depending on the cantilever probe and the details of the tip-sample contact mechanics, the number, magnitude, breadth and frequency of the peaks is subject to change. Sweeps such as these are useful in choosing the operating points for imaging and other measurements. In a practical experiment, any or all of these resonance peaks or the frequencies in between could be exploited by the methods suggested above.

Figure 19:
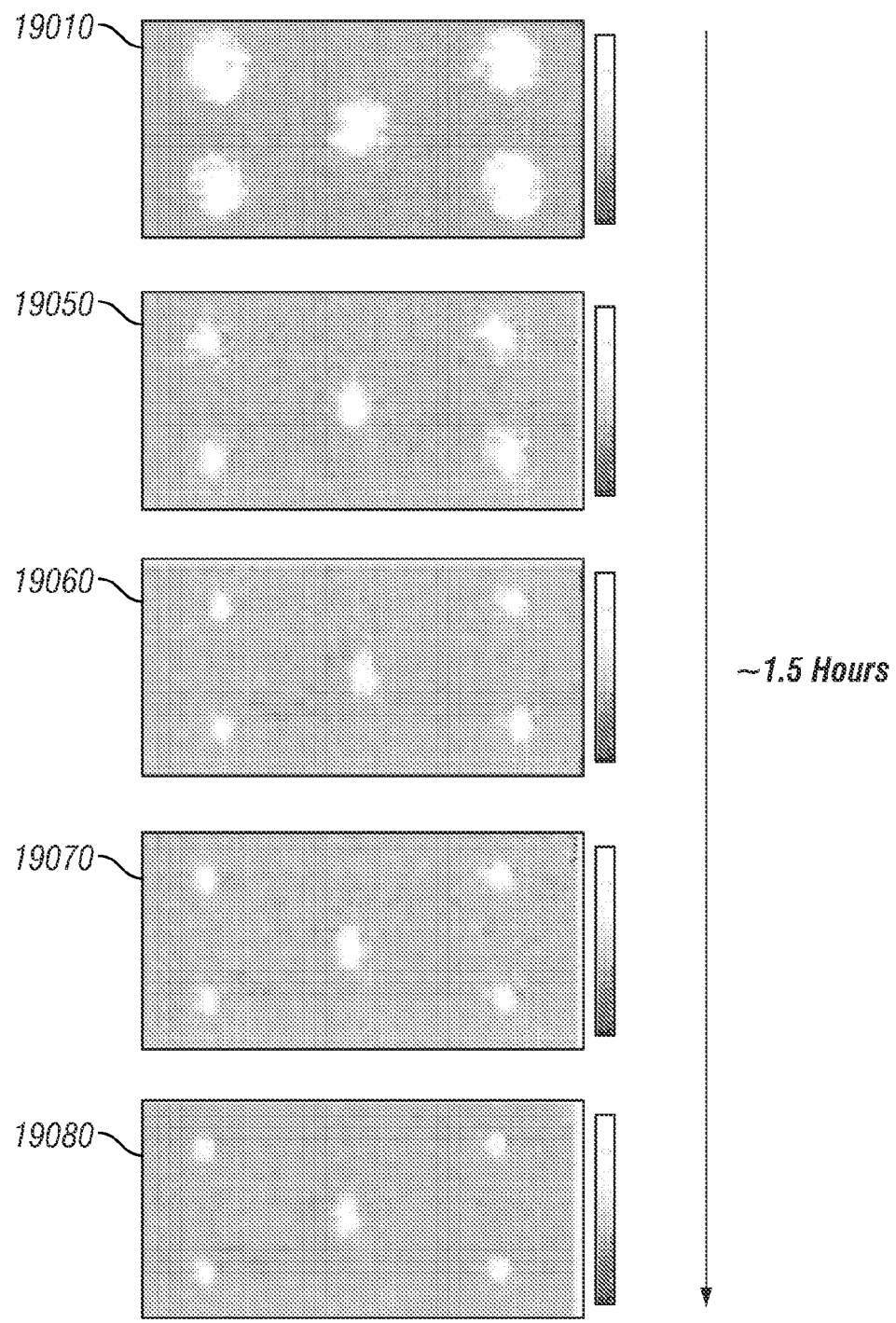

FIGS. 17-19 shows a measurement that can be made using DFRT PFM techniques. A phase image 19010 shows ferroelectric domains written onto a sol-gel PZT surface. Because of the excellent separation between topography and PFM response possible with DFRT PFM, the phase image shows only piezo response, there is no topographic roughness coupling into the phase. The written domains appear as bright regions. The writing was accomplished by locally performing and measuring hysteresis loops by applying a DC bias to the tip during normal DFRT PFM operation. This allows the local switching fields to be measured. The piezo phase 19030 during a measurement made at location 19020 and the amplitude 19040 are plotted as a function of the applied DC bias voltage. The loops were made following Stephen Jesse et al, Rev. Sci. Inst. 77, 073702 (2006). Other loops were taken at the bright locations in image 19010, but are not shown in the Figure.

DFRT PFM is very stable over time in contrast to single frequency techniques. This allows time dependent processes to be studied as is demonstrated by the sequence of images, 19010, 19050, 19060, 19070 and 19080 taken over the span of 1.5 hours. In these images, the written domains are clearly shrinking over time.

In AC mode atomic force microscopy, relatively tiny tip-sample interactions can cause the motion of a cantilever probe oscillating at resonance to change, and with it the resonant frequency, phase and amplitude and deflection of the probe. Those changes of course are the basis of the inferences that make AC mode so useful. With contact resonance techniques the contact between the tip and the sample also can cause the resonant frequency, phase and amplitude of the cantilever probe to change dramatically.

The resonant frequency of the cantilever probe using contact resonance techniques depends on the properties of the contact, particularly the contact stiffness. Contact stiffness in turn is a function of the local mechanical properties of the tip and sample and the contact area. In general, all other mechanical properties being equal, increasing the contact stiffness by increasing the contact area, will increase the resonant frequency of the oscillating cantilever probe. This interdependence of the resonant properties of the oscillating cantilever probe and the contact area represents a significant shortcoming of contact resonance techniques. It results in "topographical crosstalk" that leads to significant interpretational issues. For example, it is difficult to know whether or not a phase or amplitude change of the probe is due to some sample property of interest or simply to a change in the contact area.

The apparatus used in contact resonance techniques can also cause the resonant frequency, phase and amplitude of the cantilever probe to change unpredictably. Examples are discussed by Rabe et al., Rev. Sci. Instr. 67, 3281 (1996) and others since then. One of the most difficult issues is that the means for holding the sample and the cantilever probe involve mechanical devices with complicated, frequency dependent responses. Since these devices have their own resonances and damping, which are only rarely associated with the sample and tip interaction, they may cause artifacts in the data produced by the apparatus. For example, phase and amplitude shifts caused by the spurious instrumental resonances may freely mix with the resonance and amplitude shifts that originate with tip-sample interactions.

It is advantageous to track more than two resonant frequencies as the probe scans over the surface when using contact resonance techniques. Increasing the number of frequencies tracked provides more information and makes it possible to over-constrain the determination of various physical properties. As is well known in the art, this is advantageous since multiple measurements will allow better determination of parameter values and provide an estimation of errors.

Figure 13:
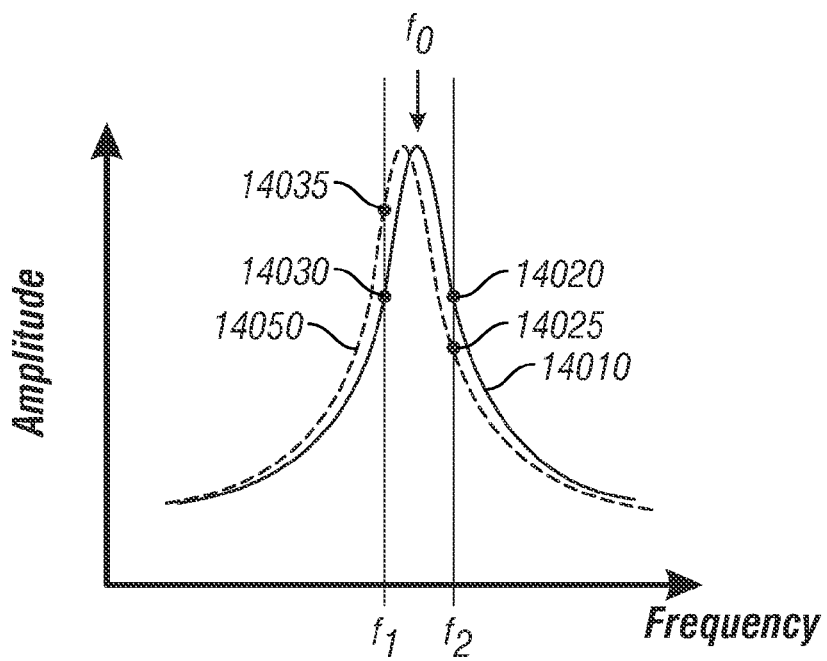
FIG. 13 Amplitude and phase curves changing in response to varying tip-sample interactions being driven first at a single frequency and then at two different frequencies.

Since the phase of the cantilever response is not a well behaved quantity for feedback purposes in PFM, we have developed other methods for measuring and/or tracking shifts in the resonant frequency of the probe. One method is based on making amplitude measurements at more than one frequency, both of which are at or near a resonant frequency. FIG. 13 illustrates the idea. The original resonant frequency curve 14010 has amplitudes $A_1$ 14030 and $A_2$ 14020, respectively, at the two drive frequencies $f_1$ and $f_2$. However, if the resonant frequency shifted to a lower value, the curve shifts to 14050 and the amplitudes at the measurement frequencies change, A'$_1$ 14035 increasing and A'$_2$ 14025 decreasing. If the resonant frequency were higher, the situation would reverse, that is the amplitude A'$_1$ at drive frequency f$_1$ would decrease and A'$_2$ at f$_2$ would increase.

There are many methods to track the resonant frequency with information on the response at more than one frequency. One method with DFRT PFM is to define an error signal that is the difference between the amplitude at f$_1$ and the amplitude at f$_2$, that is A$_1$ minus A$_2$. A simpler example would be to run the feedback loop such that A$_1$ minus A$_2$=0, although other values could equally well be chosen. Alternatively both f$_1$ and f$_2$ could be adjusted so that the error signal, the difference in the amplitudes, is maintained. The average of these frequencies (or even simply one of them) provides the user with a measure of the contact resonance frequency and therefore the local contact stiffness. It is also possible to measure the damping and drive with the two values of amplitude. When the resonant frequency has been tracked properly, the peak amplitude is directly related to the amplitude on either side of resonance. One convenient way to monitor this is to simply look at the sum of the two amplitudes. This provides a better signal to noise measurement than does only one of the amplitude measurements. Other, more complicated feedback loops could also be used to track the resonant frequency. Examples include more complex functions of the measured amplitudes, phases (or equivalently, the in-phase and quadrature components), cantilever deflection or lateral and/or torsional motion. The values of the two amplitudes also allow conclusions to be drawn about damping and drive amplitudes. For example, in the case of constant damping, an increase in the sum of the two amplitudes indicates an increase in the drive amplitude while the difference indicates a shift in the resonant frequency.

Finally, it is possible to modulate the drive amplitude and/or frequencies and/or phases of one or more of the frequencies. The response is used to decode the resonant frequency and, optionally, adjust it to follow changes induced by the tip-sample interactions.

Figure 10D:
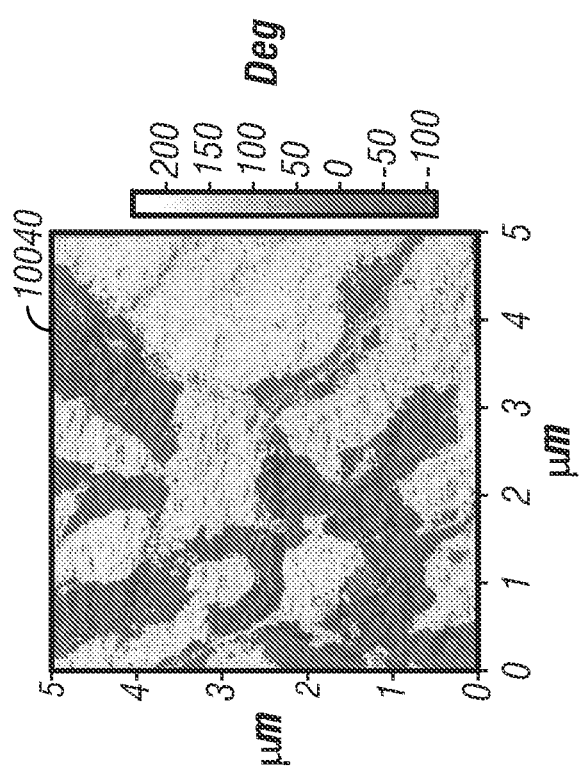

FIG. 10 shows the results of a measurement of a piezoelectric material using DFRT PFM methods. Contact mode is used to image the sample topography 10010 and contact resonance techniques used to image the first frequency amplitude 10020, the second frequency amplitude 10030, the first frequency phase 10040 and the second frequency phase 10050. In this experiment, the two frequencies were chosen to be close to the first contact resonance, at roughly the half-maximum point, with the first frequency on the lower side of the resonance curve and the second on the upper side. This arrangement allowed some of the effects of crosstalk to be examined and potentially eliminated in subsequent imaging.

Another multiple frequency technique is depicted in FIG. 2, an apparatus for using the present invention with a conductive cantilever, and the methods for its use may also be advantageous in examining the effects of crosstalk with a view to potentially eliminating them in subsequent imaging. For this purpose the inventors refer which to this apparatus and method as Dual Frequency Piezo Force Microscopy (DF PFM). In the DF PFM apparatus of FIG. 2 the response to driving the tip voltage of the cantilever, due to the piezoelectric action acting through the contact mechanics, will typically change as the probe is scanned over the surface. The first signal will then be representative of changes in the contact mechanics between the tip and sample. The second signal will depend both on contact mechanics and on the piezo electrical forces induced by the second excitation signal between the tip and sample. Differences between the response to the first excitation and the response to the second are thus indicative of piezoelectric properties of the sample and allow the contact mechanics to be separated from such properties.

As noted, the user often does not have independent knowledge about the drive or damping in contact resonance. Furthermore, models may be of limited help because they too require information not readily available. In the simple harmonic oscillator model for example, the drive amplitude A$_{drive}$, drive phase $\phi_{drive}$, resonant frequency $\omega_0$ and quality factor Q (representative of the damping) will all vary as a function of the lateral tip position over the sample and may also vary in time depending on cantilever mounting schemes or other instrumental factors. In conventional PFM, only two time averaged quantities are measured, the amplitude and the phase of the cantilever (or equivalently, the in-phase and quadrature components). However, in dual or multiple frequency excitations, more measurements may be made, and this will allow additional parameters to be extracted. In the context of the SHO model, by measuring the response at two frequencies at or near a particular resonance, it is possible to extract four model parameters. When the two frequencies are on either side of resonance, as in the case of DFRT PFM for example, the difference in the amplitudes provides a measure of the resonant frequency, the sum of the amplitudes provides a measure of the drive amplitude and damping of the tip-sample interaction (or quality factor), the difference in the phase values provides a measure of the quality factor and the sum of the phases provides a measure of the tip-sample drive phase.

Simply put, with measurements at two different frequencies, we measure four time averaged quantities, A$_1$, A$_2$, $\phi_1$, $\phi_2$ that allow us to solve for the four unknown parameters A$_{drive}$, $\phi_{drive}$, $\omega_0$ and Q.

Figure 15:
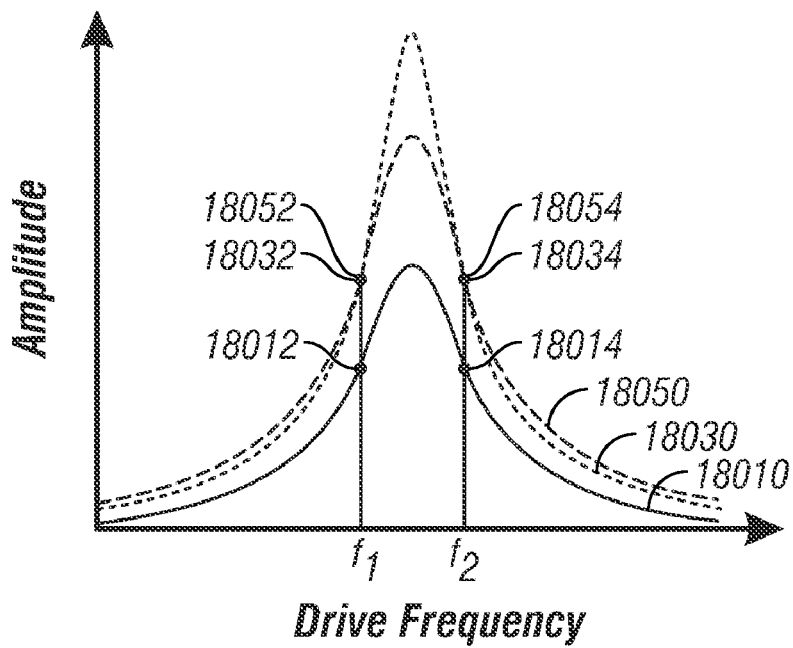
FIG. 15-16 Amplitude versus frequency and phase versus frequency curves simultaneous measured at different frequencies.
Figure 16:
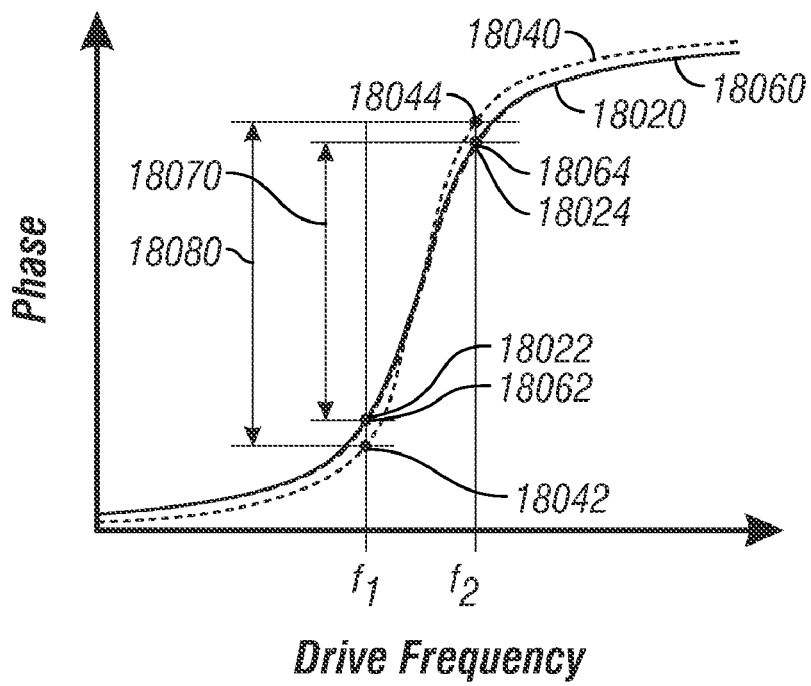

FIG. 15-16 illustrates the usefulness of measuring the phase as a means of separating changes in the quality factor Q from changes in the drive amplitude A$_{drive}$. Curve 18010 shows the amplitude response of an oscillator with a resonance frequency of $\omega_0$=320 kHz, a quality factor Q=110 and a drive amplitude A$_{drive}$=0.06 nm. Using DFRT PFM techniques, the amplitude A$_1$ 18012 is measured at a drive frequency f$_1$ and the amplitude A$_2$ 18014 is measured at a drive frequency f$_2$. Curve 18030 shows what happens when the Q value increases to 150. The first amplitude A$_1$ 18032 increases because of this increase in Q, as does the second amplitude A2 18034. Curve 18050 shows what happens when the quality factor Q, remains at 110 and the drive amplitude A$_{drive}$ increases from 0.06 nm to 0.09 nm. Now, the amplitude measurements made at f1 18052 and f2 18054 are exactly the same as in the case where the Q value increased to 150, 18032 and 18034, respectively. The amplitude response does not separate the difference between increasing the Q value or increasing the drive amplitude A$_{drive}$.

This difficulty is surmounted by measuring the phase. Curves 18020, 18040 and 18060 are the phase curves corresponding to the amplitude curves 18010, 18030 and 18050 respectively. As with the amplitude measurements, the phase is measured at discrete frequency values, f$_1$ and f$_2$. The phase curve 18020 remains unchanged 18060 when the drive amplitude A$_{drive}$ increases from 0.06 nm to 0.09 nm. Note that the phase measurements 18022 and 18062 at f$_1$ for the curves with the same quality factor are the same, as are the phase measurements 18024 and 18064 at f$_2$. When the quality factor Q increases, the f$_1$ phase 18042 decreases and the f$_2$ phase 18044 increases. These changes clearly separate drive amplitude changes from Q value changes.

In the case where the phase baseline does not change, it is possible to obtain the Q value from one of the phase measurements. However, as in the case of PFM and thermal modulated microscopy, the phase baseline may well change. In this case, it is advantageous to look at the difference 18070 in the two phase values. When the Q increases, this difference 18080 will also increase.

If we increase the number of frequencies beyond two, other parameters can be evaluated such as the linearity of the response or the validity of the simple harmonic oscillator model Once the amplitude, phase, quadrature or in-phase component is measured at more than one frequency, there are numerous deductions that can be made about the mechanical response of the cantilever to various forces. These deductions can be made based around a model, such as the simple harmonic oscillator model or extended, continuous models of the cantilever or other sensor. The deductions can also be made using a purely phenomenological approach. One simple example in measuring passive mechanical properties is that an overall change in the integrated amplitude of the sensor response implies a change in the damping of the sensor. In contrast, a shift in the "center" of the amplitude in amplitude versus frequency measurements implies that the conservative interactions between the sensor and the sample have changed.

This idea can be extended to more and more frequencies for a better estimate of the resonant behavior. It will be apparent to those skilled in the art that this represents one manner of providing a spectrum of the sensor response over a certain frequency range. The spectral analysis can be either scalar or vector. This analysis has the advantage that the speed of these measurements is quite high with respect to other frequency dependent excitations.

In measuring the frequency response of a sensor, it is not required to excite the sensor with a constant, continuous signal. Other alternatives such as so-called band excitation, pulsed excitations and others could be used. The only requirement is that the appropriate reference signal be supplied to the detection means.

Figure 14:
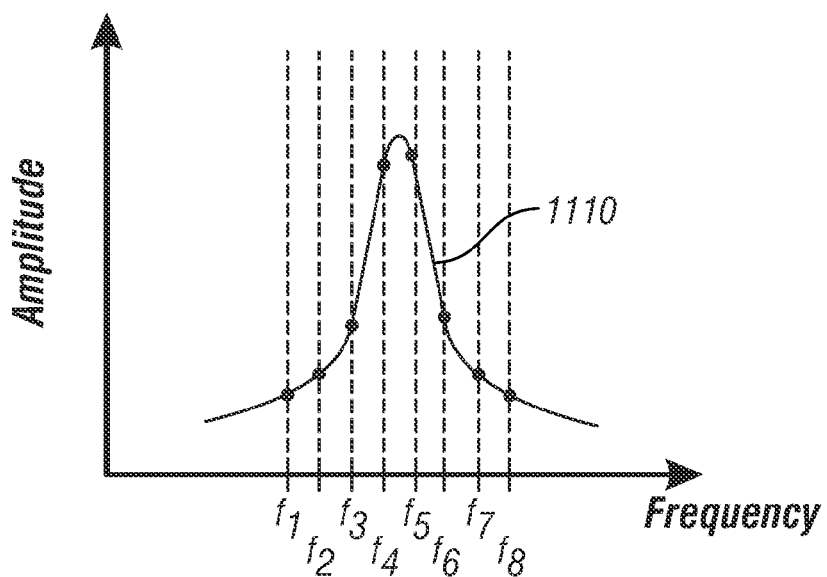
FIG. 14 Amplitude versus frequency sweeps around the second resonance made while feeding back on the first mode amplitude.

FIG. 14 shows one embodiment of a multi-frequency approach, with eight frequencies being driven $f_1$ through $f_8$. As the resonance curve changes in response to tip-surface interactions, a more complete map of the frequency response is traced out. This may be particularly useful when measuring non-linear interactions between the tip and the sample because in that case the simple harmonic oscillator model no longer applies. The amplitude and phase characteristics of the sensor may be significantly more complex. As an example of this sort of measurement, one can drive the cantilever at one or more frequencies near resonance and measure the response at nearby frequencies.

Scanning ion conductance microscopy, scanning electrochemical microscopy, scanning tunneling microscopy, scanning spreading resistance microscopy and current sensitive atomic force microscopy are all examples of localized transport measurements that make use of alternating signals, sometimes with an applied dc bias. Electrical force microscopy, Kelvin probe microscopy and scanning capacitance microscopy are other examples of measurement modes that make use of alternating signals, sometimes with an applied dc bias. These and other techniques known in the art can benefit greatly from excitation at more than one frequency. Furthermore, it can also be beneficial if excitation of a mechanical parameter at one or more frequencies is combined with electrical excitation at the same or other frequencies. The responses due to these various excitations can also be used in feedback loops, as is the case with Kelvin force microscopy where there is typically a feedback loop operating between a mechanical parameter of the cantilever dynamics and the tip-sample potential.

The described embodiments of the invention are only considered to be preferred and illustrative of the inventive concept. The scope of the invention is not to be restricted to such embodiments. Various and numerous other arrangements may be devised by one skilled in the art without departing from the spirit and scope of the invention.

What is claimed is:

1. A method of operating an atomic force microscope which processes a sample, comprising:
    using a feedback loop to control a distance between a base of a cantilever of the atomic force microscope which has a probe tip, and a surface of the sample to maintain the probe tip of the cantilever in a pre-established relationship with respect to the surface of the sample while scanning the sample by creating relative movement between the probe tip of the cantilever and the sample;
    exciting a chip of the cantilever at two or more synthesized frequencies that have been summed together by a circuit element;
    providing each of said synthesized frequencies as a reference signal to a lock-in amplifier; and
    measuring cantilever values, including the amplitude and phase of the cantilever at the different excitation frequencies; and
    using the measured cantilever values to provide information indicative of a surface of the sample.

2. The method according to claim 1, comprising:
    displaying the measured amplitude and phase of the cantilever.

3. The method of claim 1 where a function of the two measured amplitudes is used in a feedback loop to control the excitation frequencies.

* * * * *